United States Patent [19]
Reis et al.

[11] Patent Number: 5,341,143
[45] Date of Patent: Aug. 23, 1994

[54] HIERARCHICAL TRACKER AND METHOD

[75] Inventors: James J. Reis, LaPalma; Anthony L. Luk, Rancho Palos Verdes; David D. Garber, Cypress, all of Calif.

[73] Assignee: Northrop Grumman Corporation, Los Angeles, Calif.

[21] Appl. No.: 234,710

[22] Filed: Aug. 19, 1988

Related U.S. Application Data

[63] Continuation-in-part of Ser. No. 77,717, Jul. 24, 1987, abandoned.

[51] Int. Cl.$^5$ .................... G01S 13/66; G06F 15/50
[52] U.S. Cl. .................... 342/64; 342/52; 342/55; 342/62; 244/3.15; 244/3.16; 244/3.17
[58] Field of Search ............ 244/3.15, 3.16, 3.17, 244/3.19; 342/52–55, 59, 62, 64, 68

[56] References Cited

U.S. PATENT DOCUMENTS

| | | | |
|---|---|---|---|
| 3,076,961 | 2/1963 | Bibbero | 342/53 |
| 3,108,270 | 10/1963 | Fairbanks | 342/53 |
| 3,501,762 | 3/1970 | Klees | 342/53 |
| 3,724,783 | 4/1973 | Nolan, Jr. et al. | 244/3.15 |
| 3,737,120 | 6/1973 | Green | 244/3.17 |
| 3,740,002 | 6/1973 | Schaefer | 244/3.19 |
| 3,970,269 | 7/1976 | Conforti | 244/3.16 |
| 4,106,726 | 8/1978 | Emmons et al. | 244/3.17 |
| 4,122,521 | 10/1978 | Rick et al. | 342/52 X |
| 4,160,974 | 7/1979 | Stavis | 244/3.19 X |
| 4,162,775 | 7/1979 | Voles | 244/3.17 |
| 4,193,072 | 3/1980 | McKusick | 342/53 |
| 4,264,907 | 4/1981 | Durand, Jr. et al. | 342/53 |
| 4,422,075 | 12/1983 | Nerheim | 342/52 |
| 4,497,065 | 1/1985 | Tisdale et al. | 244/3.15 X |

*Primary Examiner*—Bernarr E. Gregory
*Attorney, Agent, or Firm*—Terry J. Anderson; Robert B. Block; Karl J. Hoch, Jr.

[57] ABSTRACT

Method and apparatus for guiding a projectile to a target in a scene using a scene imaging sensor in which the projectile has a guidance and control system for aiming the projectile. A first tracker analyzes the scene and selects a first track point representative of a target and a first confidence value serving as a reliability measure of the first selected track point. A second tracker analyzes the scene and selects a second track point representing the target and a second confidence value which serves as a reliability measure of the second selected track point. Each of said trackers are constructed and arranged to operate independently in a manner that is substantially statistically uncorrelated with respect to each other. A joint confidence value based on track point proximity, convergence and divergence is generated from the tracker data and a composite confidence index is calculated from the first and second confidence values and the joint confidence value. The first and second track points are linearly combined pursuant to one of a set of rules selected by the confidence index to provide a new track point which is outputted to the projectile guidance and control system and new start track points are generated that are specially suited to restart the trackers in a new operation cycle.

24 Claims, 11 Drawing Sheets

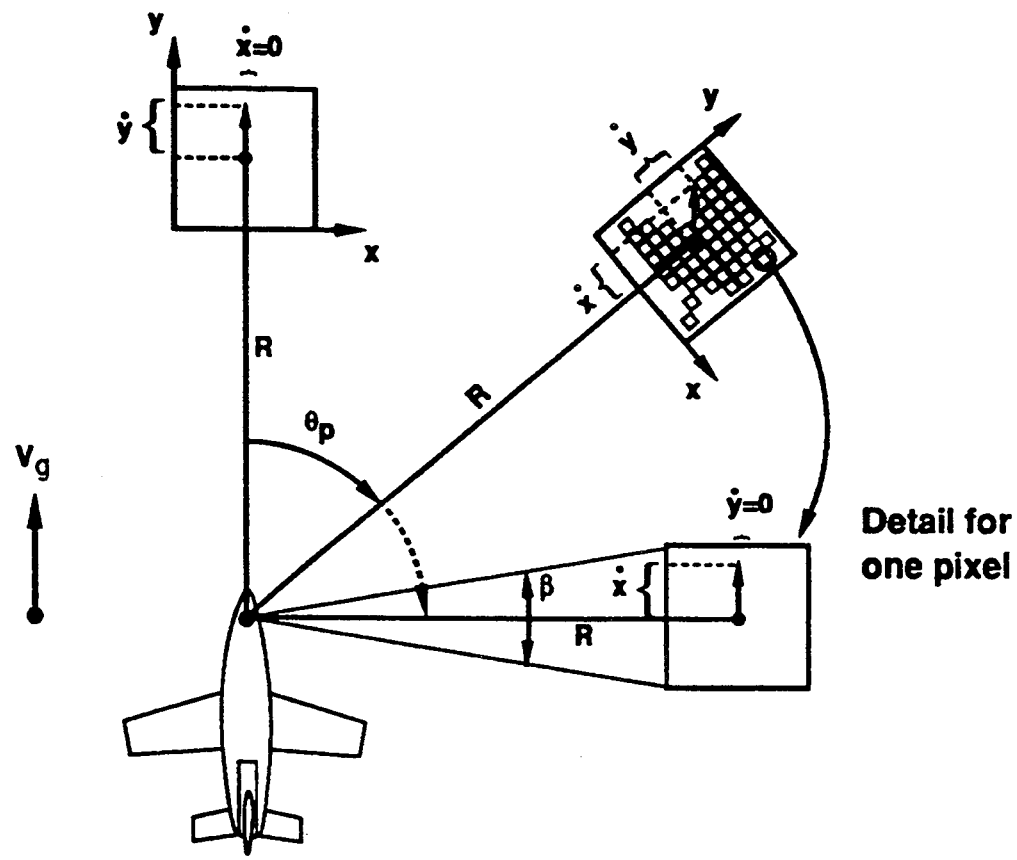

$V_g$ = True ground speed of aircraft carrying the sensor (ft/sec)

$\theta_p$ = Sensor pointing angle (relative to aircraft's velocity vector)

$V_a$ = Apparent speed of aircraft in pixel/sec. This is a function of true ground speed, sensor field of view, range ot track point, etc.

$\dot{x}$ = Apparent pixel velocity in the x-direction W.R.T. sensor coordinates.

$\dot{y}$ = Apparent pixel velocity in the y-direction W.R.T. sensor coordinates.

R = Slant range to the track point in feet.

$\beta$ = Instantaneous field of view of the sensor in radians per pixel.

Figure 2

HANDOFF EXAMPLE

Figure 3

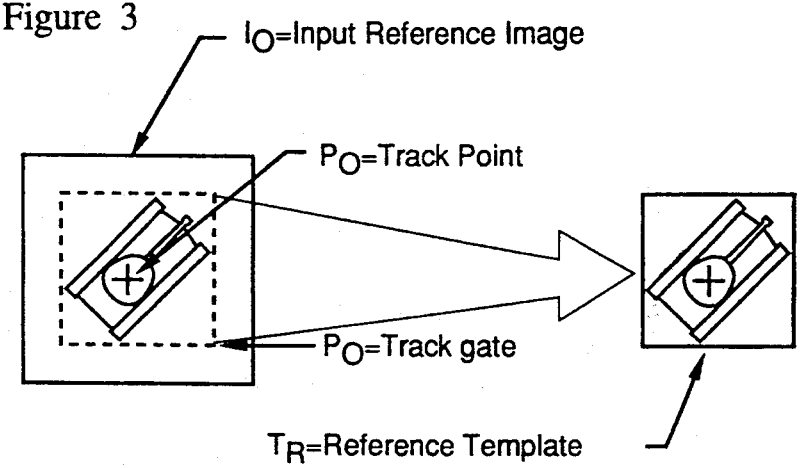

- $I_O$ = Input Reference Image
- $P_O$ = Track Point
- $P_O$ = Track gate
- $T_R$ = Reference Template

CLASSICAL TRACKER ALGORITHM EXAMPLE

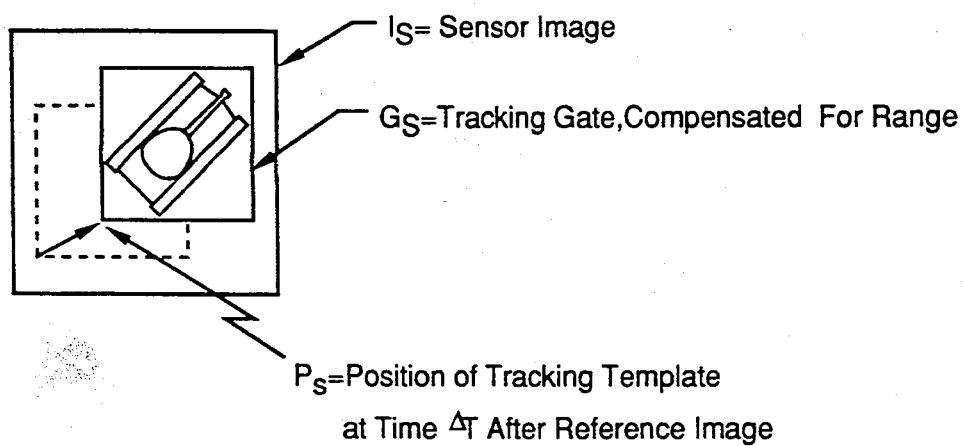

- $I_S$ = Sensor Image
- $G_S$ = Tracking Gate, Compensated For Range
- $P_S$ = Position of Tracking Template at Time $\Delta T$ After Reference Image

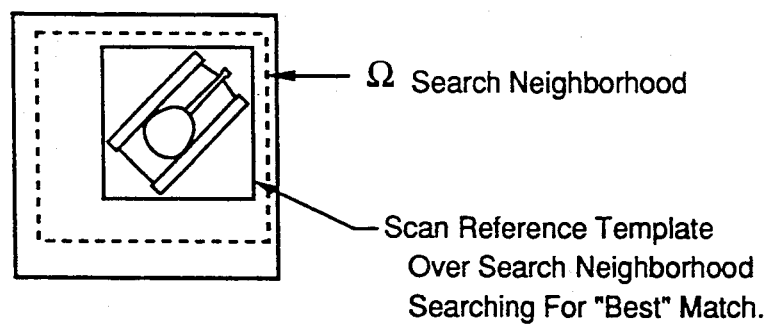

- $\Omega$ Search Neighborhood
- Scan Reference Template Over Search Neighborhood Searching For "Best" Match.

Figure 4

TPCL Case Selection Table

TPCL Table of TPCL Composite Track Position Weight

| $C_J$ | $C_G$ | $C_N$ | Index | Case |
|---|---|---|---|---|
| 0 | 0 | 0 | 0 | 1 |
| 0 | 0 | 1 | 1 | 2 |
| 0 | 0 | 2 | 2 | 8 |
| 0 | 1 | 0 | 3 | 3 |
| 0 | 1 | 1 | 4 | 5 |
| 0 | 1 | 2 | 5 | 12 |
| 0 | 2 | 0 | 6 | 9 |
| 0 | 2 | 1 | 7 | 13 |
| 0 | 2 | 2 | 8 | 18 |
| 1 | 0 | 0 | 9 | 4 |
| 1 | 0 | 1 | 10 | 6 |
| 1 | 0 | 2 | 11 | 14 |
| 1 | 1 | 0 | 12 | 7 |
| 1 | 1 | 1 | 13 | 11 |
| 1 | 1 | 2 | 14 | 19 |
| 1 | 2 | 0 | 15 | 15 |
| 1 | 2 | 1 | 16 | 20 |
| 1 | 2 | 2 | 17 | 24 |
| 2 | 0 | 0 | 18 | 10 |
| 2 | 0 | 1 | 19 | 16 |
| 2 | 0 | 2 | 20 | 22 |
| 2 | 1 | 0 | 21 | 17 |
| 2 | 1 | 1 | 22 | 21 |
| 2 | 1 | 2 | 23 | 25 |
| 2 | 2 | 0 | 24 | 23 |
| 2 | 2 | 1 | 25 | 26 |
| 2 | 2 | 2 | 26 | 27 |

Figure 8:

| Case | TPCL: $W_T$ (Case, $i$) | | | | | | |
|---|---|---|---|---|---|---|---|
| | 1 | 2 | 3 | 4 | 5 | 6 | 7 |
| | $P_N$ | $P_{NO}$ | $P_G$ | $P_{GO}$ | $P_{TO}$ | $P_D$ | DT |
| 1 | 0 | 0 | 0 | 0 | 0 | 1 | 1 |
| 2 | 1 | L | 0 | 0 | 0 | 0 | 1+L |
| 3 | 0 | 0 | 1 | L | 0 | 0 | 1+L |
| 4 | 0 | 0 | 0 | 0 | 1 | 0 | 1 |
| 5 | 1 | L | 1 | L | 0 | 0 | 2+2L |
| 6 | 1 | L | 0 | 0 | 1 | 0 | 2+L |
| 7 | 0 | 0 | 1 | L | 1 | 0 | 2+L |
| 8 | 1 | 0 | 0 | 0 | 0 | 0 | 1 |
| 9 | 0 | 0 | 1 | 0 | 0 | 0 | 1 |
| 10 | 0 | 0 | 0 | 0 | 1 | 0 | 1 |
| 11 | 1 | L | 1 | L | L | 0 | 2+3L |
| 12 | 1-K | 0 | K | 0 | 0 | 0 | 1 |
| 13 | K | 0 | 1-K | 0 | 0 | 0 | 1 |
| 14 | 1-K | 0 | 0 | 0 | K | 0 | 1 |
| 15 | 0 | 0 | 1-K | 0 | K | 0 | 1 |
| 16 | K | 0 | 0 | 0 | 1-K | 0 | 1 |
| 17 | 0 | 0 | K | 0 | 1-K | 0 | 1 |
| 18 | 1 | 0 | 1 | 0 | 0 | 0 | 2 |
| 19 | 1-F | 0 | F | 0 | F | 0 | 1+F |
| 20 | F | 0 | 1-F | 0 | F | 0 | 1+F |
| 21 | F | 0 | F | 0 | 1-F | 0 | 1+F |
| 22 | 1 | 0 | 0 | 0 | 1 | 0 | 2 |
| 23 | 0 | 0 | 1 | 0 | 1 | 0 | 2 |
| 24 | 1-F | 0 | 1-F | 0 | F | 0 | 2-F |
| 25 | 1-F | 0 | F | 0 | 1-F | 0 | 2-F |
| 26 | F | 0 | 1-F | 0 | 1-F | 0 | 2-F |
| 27 | 1 | 0 | 1 | 0 | 1 | 0 | 3 |

Figure 9:

TPCL Table of NPC Composite Track Position Weight $$K \approx \frac{1}{3}, \qquad F \approx \frac{1}{3}$$

| Case | NPC: $W_N(\text{Case}, i)$ ||||||| REFN |
| | 1 | 2 | 3 | 4 | 5 | 6 | 7 | |
| | $P_N$ | $P_{NO}$ | $P_G$ | $P_{GO}$ | $P_{TO}$ | $P_D$ | DT | |
|---|---|---|---|---|---|---|---|---|
| 1  | 0   | 0 | 0   | 0 | 0   | 1 | 1    | 1 |
| 2  | 1   | L | 0   | 0 | 0   | 0 | 1+L  | 1 |
| 3  | 0   | 0 | 1   | L | 0   | 0 | 1+L  | 1 |
| 4  | 0   | 0 | 0   | 0 | 1   | 0 | 1    | 1 |
| 5  | 1   | L | 1   | L | 0   | 0 | 2+2L | 1 |
| 6  | 1   | L | 0   | 0 | 1   | 0 | 2+L  | 1 |
| 7  | 0   | 0 | 1   | L | 1   | 0 | 2+L  | 1 |
| 8  | 1   | 0 | 0   | 0 | 0   | 0 | 1    | 0 |
| 9  | 0   | 0 | 1   | 0 | 0   | 0 | 1    | 1 |
| 10 | 0   | 0 | 0   | 0 | 1   | 0 | 1    | 0 |
| 11 | 1   | L | 1   | L | L   | 0 | 2+3L | 1 |
| 12 | 1-K | 0 | K   | 0 | 0   | 0 | 1    | 0 |
| 13 | K   | 0 | 1-K | 0 | 0   | 0 | 1    | 1 |
| 14 | 1-K | 0 | 0   | 0 | K   | 0 | 1    | 0 |
| 15 | 0   | 0 | 1-K | 0 | K   | 0 | 1    | 1 |
| 16 | K   | 0 | 0   | 0 | 1-K | 0 | 1    | 1 |
| 17 | 0   | 0 | K   | 0 | 1-K | 0 | 1    | 1 |
| 18 | 1   | 0 | 1   | 0 | 0   | 0 | 2    | 0 |
| 19 | 1-F | 0 | F   | 0 | F   | 0 | 1+F  | 0 |
| 20 | F   | 0 | 1-F | 0 | F   | 0 | 1+F  | 1 |
| 21 | F   | 0 | F   | 0 | 1-F | 0 | 1+F  | 1 |
| 22 | 1   | 0 | 0   | 0 | 1   | 0 | 2    | 0 |
| 23 | 0   | 0 | 1   | 0 | 1   | 0 | 2    | 1 |
| 24 | 1-F | 0 | 1-F | 0 | F   | 0 | 2-F  | 0 |
| 25 | 1-F | 0 | F   | 0 | 1-F | 0 | 2-F  | 0 |
| 26 | F   | 0 | 1-F | 0 | 1-F | 0 | 2-F  | 1 |
| 27 | 1   | 0 | 1   | 0 | 1   | 0 | 3    | 0 |

Figure 10:

TPCL Table of GTIR Composite Track Position Weight $$K \approx \frac{1}{3}, \qquad F \approx \frac{1}{3}$$

| Case | \multicolumn{7}{c}{GTIR: $W_G$(Case, $i$)} | REFG |
|------|------|------|------|------|------|------|------|------|
|      | 1 | 2 | 3 | 4 | 5 | 6 | 7 | |
|      | $P_N$ | $P_{NO}$ | $P_G$ | $P_{GO}$ | $P_{TO}$ | $P_D$ | DT | |
| 1  | 0   | 0 | 0   | 0 | 0   | 1 | 1    | 1 |
| 2  | 1   | L | 0   | 0 | 0   | 0 | 1+L  | 3 |
| 3  | 0   | 0 | 1   | L | 0   | 0 | 1+L  | 1 |
| 4  | 0   | 0 | 0   | 0 | 1   | 0 | 1    | 3 |
| 5  | 1   | L | 1   | L | 0   | 0 | 2+2L | 1 |
| 6  | 1   | L | 0   | 0 | 1   | 0 | 2+L  | 3 |
| 7  | 0   | 0 | 1   | L | 1   | 0 | 2+L  | 1 |
| 8  | 1   | 0 | 0   | 0 | 0   | 0 | 1    | 3 |
| 9  | 0   | 0 | 1   | 0 | 0   | 0 | 1    | 2 |
| 10 | 0   | 0 | 0   | 0 | 1   | 0 | 1    | 3 |
| 11 | 1   | L | 1   | L | L   | 0 | 2+3L | 1 |
| 12 | 1-K | 0 | K   | 0 | 0   | 0 | 1    | 1 |
| 13 | K   | 0 | 1-K | 0 | 0   | 0 | 1    | 1 |
| 14 | 1-K | 0 | 0   | 0 | K   | 0 | 1    | 3 |
| 15 | 0   | 0 | 1-K | 0 | K   | 0 | 1    | 2 |
| 16 | K   | 0 | 0   | 0 | 1-K | 0 | 1    | 3 |
| 17 | 0   | 0 | K   | 0 | 1-K | 0 | 1    | 2 |
| 18 | 1   | 0 | 1   | 0 | 0   | 0 | 2    | 1 |
| 19 | 1-F | 0 | F   | 0 | F   | 0 | 1+F  | 1 |
| 20 | F   | 0 | 1-F | 0 | F   | 0 | 1+F  | 2 |
| 21 | F   | 0 | F   | 0 | 1-F | 0 | 1+F  | 1 |
| 22 | 1   | 0 | 0   | 0 | 1   | 0 | 2    | 3 |
| 23 | 0   | 0 | 1   | 0 | 1   | 0 | 2    | 2 |
| 24 | 1-F | 0 | 1-F | 0 | F   | 0 | 2-F  | 2 |
| 25 | 1-F | 0 | F   | 0 | 1-F | 0 | 2-F  | 1 |
| 26 | F   | 0 | 1-F | 0 | 1-F | 0 | 2-F  | 2 |
| 27 | 1   | 0 | 1   | 0 | 1   | 0 | 3    | 2 |

Figure 11:

GTIR Generation Kernel $$K = \begin{array}{|c|c|c|c|c|c|c|} \hline B & B & B & B & B & B & B \\ \hline B & & & & & & B \\ \hline B & & & & & & B \\ \hline B & & & T & & & B \\ \hline B & & & & & & B \\ \hline B & & & & & & B \\ \hline B & B & B & B & B & B & B \\ \hline \end{array} \ ; \quad I_{\text{GTIR}} = \hat{I}_S * K$$

where, $\hat{I}_S$ = Reduced 2:1 sensor image
$*$ = Generalized convolution
$K$ = GTIR convolutional kernel
  = $|\mu_T - \mu_B|/\sigma_B$ $\mu_T$ = Mean of target pixels, $T$
$\mu_B$ = Mean of background pixels, $B$
$\sigma_B$ = Standard deviation of background pixels, $B$

Figure 13:

GTIR Peak Isolation Filter Definition

| $a_{44}$ | | | $a_{34}$ | | | $a_{24}$ |
|---|---|---|---|---|---|---|
| | $a_{43}$ | | $a_{33}$ | | $a_{23}$ | |
| | | $a_{42}$ | $a_{32}$ | $a_{22}$ | | |
| | | $a_{41}$ | $a_{31}$ | $a_{21}$ | | |
| $a_{54}\ a_{53}\ a_{52}\ a_{51}$ | | | $G_{\max}$ | $a_{11}\ a_{12}\ a_{13}\ a_{14}$ | | |
| | | $a_{61}$ | $a_{71}$ | $a_{81}$ | | |
| | | $a_{62}$ | $a_{72}$ | $a_{82}$ | | |
| | $a_{63}$ | | $a_{73}$ | | $a_{83}$ | |
| $a_{64}$ | | | $a_{74}$ | | | $a_{84}$ |

$$A_k = \min\{a_{k1}, a_{k2}, a_{k3}, a_{k4}\}, \quad k = 1 \cdots 8$$
$$A_{\max} = \max\{A_1, A_2, A_3, A_4, A_5, A_6, A_7, A_8\}$$

Figure 14:

HIERARCHICAL TRACKER AND METHOD

CONTRACTUAL ORIGIN OF THE INVENTION

The United States government has rights in this invention pursuant to Contract No. DAAH01-82-C-A106.

CROSS REFERENCE TO RELATED APPLICATION

This is a continuation in part of our prior U.S. application Ser. No. 077,717, filed Jul. 24, 1987, for Target Acquisition and Tracking System, now abandoned.

FIELD OF INVENTION

This invention relates to the tracking of maneuvering or stationary targets in a cluttered background from a maneuvering or stationary platform.

BACKGROUND

The tracking of military targets is a central part of many military weapons delivery systems and reconnaissance systems. Examples include the delivery of submissiles from an attack aircraft to target ground armor, the tracking of incoming aircraft and missiles for purposes of self-defense, and the tracking and targeting of one ground vehicle by another.

The autonomous tracking of mobile military ground targets by "smart" weapons is an especially important application area which generally exceeds the capabilities of conventional target trackers. As the smart weapon closes on the selected target, the viewing geometry and target observability radically changes, frequently resulting in loss of target lock.

In the cross referenced system, a canister of submissiles is deployed to a predetermined location over an area of known target concentration and the submissiles are randomly dispensed. As illustrated in FIG. 1, during DEPLOYMENT each submissile orients itself to look straight down at the ground by sensing gravity. During the GROUND LOCK mode, the submissile extracts ground features to estimated its translation and rotation rate with respect to the ground. These rates are used by the submissile's Guidance and Control (G&C) system to lock the submissile onto the ground to reduce motion induced blurring of the imagery. The TARGET ACQUISITION mode examines the submissile's field of view for potential targets. The highest priority target is handed off to the TRACKER resulting in "lock-on" or "target lock". The AIMPOINT SELECTION mode uses target vulnerability knowledge to select an aimpoint which maximized warhead effectiveness. The TRACKING mode is the subject of the present invention.

CLASSICAL TRACKER ALGORITHM

The classical tracker algorithm consists of two main parts, HANDOFF and TRACKER. HANDOFF initalizes TRACKER with starting conditions. TRACKER takes these starting conditions and continuously updates them based upon dynamic conditions at hand, and generates a correction signal to the platform which is used to keep the tracked object centered in the tracking gate.

A simplified form of the classical handoff and tracking algorithms is now described with the help of FIG. 2 to illustrate the geometry of the tracking problem and FIGS. 3 and 4 to illustrate the signal processing performed on the sensed imagery during HANDOFF and TRACKING. Image "points" are ordered pairs of numbers, $\{X, Y\}$, denoting the X and Y location of a pixel in sensor coordinates. Arithmetic involving "points" is a linear process:

$$\alpha P_1 + \beta P_2 + C = \{\alpha X_1 + \beta X_2 + C, \alpha Y_1 + \beta Y_2 + C\}.$$

Begin Handoff
1. Input track point $P_0 = \{X_0, Y_0\}$ in sensor coordinates.
2. Input track gate $G_0 = \{H_0, W_0\}$ in sensor coordinates.
3. Input $V_0 = \{\dot{X}_0, \dot{Y}_0\}$ the platform induced pixel motion vector relative to sensor coordinates from G&C.
4. Input Sensed Image, $I_0$.
5. Extract from $I_0$, a reference tracking template $T_R$ of size $G_0$ centered at $P_0$.
6. Set track point, $T_P = P_0$.
7. Set Pixel Velocity $V_P = V_0$.
End Handoff
Begin Tracking-Loop
1. Input Sensed Image, $I_S$.
2. Estimate the position, $P_S$, of the sensed template. (It's now in a different location due to platform movement since handoff reference image $I_0$ was input.):

$$P_S = \{X_S, Y_S\}$$

$$X_S = X_0 + \dot{X}_0 \Delta T$$

$$Y_S = Y_0 + \dot{Y}_0 \Delta T$$

where $\Delta T$ = elapse time in seconds between reference image $I_0$ and sensed image $I_S$.
3. Input from G&C the slant range, $R_S$, to the track point.
4. Estimate the track gate size, $G_S$, due to range induced growth (shrinkage):

$$G_S = \{H_S, W_S\}$$

$$H_S = H_0 \frac{R_0}{R_S} = \text{Height of track gate}$$

$$W_S = W_0 \frac{R_0}{R_S} = \text{Width of track gate}$$

5. Estimate the uncertainty in target location due to self motion of the target and apparent target movement due to platform velocity measurement errors.
   (a) Target self motion is a priori information about the target being tracked. Worst case estimates are derived based upon the maximum speed and acceleration obtainable by the target.

$$d_T = [V_{max} \Delta T + (\tfrac{1}{2}) A_{max} (\Delta T)^2]/(R\beta)$$

where $d_T$ = maximum distance in pixels the target can travel, $\Delta T$ = time in seconds since last known position, $V_{max}$ = maximum target velocity in ft/sec, $A_{max}$ = maximum target acceleration in ft/sec$^2$ (b) Platform velocity measurement errors are expressed as a percentage, $\epsilon_P$, of platform velocity $V_0$.

$\Delta X_P = \epsilon_P \dot{X}_0 \Delta T$ in pixels $\Delta Y_P = \epsilon_P \dot{Y}_0 \Delta T$ in pixels (c) Compute worst case target location uncertainty, L, $L = \{d_T + \Delta X_P, d_T + \Delta Y_P\}$.

6. Calculate the search neighborhood, $\Omega$, to be those pixels in the rectangular region bounded by:

$\Omega$ = Maximum Rectangle($P_S \pm L$)

$X_S - X_L \leq \Omega_X \leq X_S + X_L$ $Y_S - Y_L \leq \Omega_Y \leq Y_S + Y_L$.

7. Set $P_T = P_S$; $\rho_{max} = 0$.
8. FOR $\{X,Y\}$ in neighborhood $\Omega$, LOOP: (for best match.)
   (a) Extract from $I_S$ a sensed tracking template, $T_S$, of size $G_S$ centered at $\{X,Y\}$.
   (b) Compute the similarity between $T_S$ and $T_R$ using a suitable comparison measure, such as Normalized Product Correlation (NPC):

$$\rho = \frac{Cov(T_S, R_S)}{\sigma_T \sigma_S + \epsilon} = \text{Correlation Coefficient}.$$

E = Expectation Operator $Cov(x,y) = E[(X - \mu_X)(Y - \mu_Y)]$ = Covariance of (X,Y). $\sigma_X$ = standard deviation = $\sqrt{E[(X - \mu_X)^2]} = \sqrt{Cov(x,x)}$.
$\epsilon$ = some small number, $<< q/(W_S H_S)$ (q is the quantization increment for image intensity), to avoid division by zero when $\sigma_T$ or $\sigma_S$ evaluate to zero, in which case $\rho = 0$. $\rho$ is a statistical measure of how well $T_S$ matches $R_S$. $\rho = 1$ means $T_S$ and $R_S$ match exactly, while $\rho = 0$ means $T_S$ and $R_S$ do not match at all.
IF $\rho > \rho_{max}$ THEN: (a better match is found)

$P_T = \{X,Y\}$ = coordinates of the better match.

$\rho_{max} = \rho$ = correlation coefficient of better match

END IF
END FOR-LOOP: (for best match.)
9. IF $\rho_{max} \leq \rho_1$ THEN: ($\rho_1 \cong 0.25$ is a tuning parameter which corresponds to a "lost track")

$P_T = P_S$ use last estimated location and coast

ELSE IF $\rho_{max} \leq \rho_2$ THEN: ($\rho_2 \cong .75$ is a tuning parameter which corresponds to "tracking OK" but time to update tracking template) Update the reference template due to target signature changes, e.g., rotation, growth, perspective, $T_R = T_S(P_T)$ (get a new sensed template centered at $P_T$)

END IF
10. Generate a track point error signal, $\Delta P$, $\Delta P = P_T - P_0$ 11. Output $\Delta P$ to inform G&C that the target has changed location from $P_0$ to $P_T$, in sensor coordinates. The platform, according to its G&C guidance law, will generate a sensor pointing response which tends to position the track gate in the center of the sensor's field of view. This update response is assumed to be much longer than $\Delta T$.
12. Update the current track point in sensor coordinates, $P_0 = P_T$.

END Tracking-Loop (repeat loop forever).

DESCRIPTION OF THE DRAWINGS

FIG. 2 graphically illustrates the tracker geometry.

FIG. 3 presents a classical handoff algorithm example.

FIG. 4 presents a classical tracker algorithm example.

FIG. 8 is the case selection table for the TPCL.

FIG. 9 is the TPCL table of composit track position weights.

FIG. 10 is the NPC table of composit track position weights.

FIG. 11 is the GTIR table of composit track position weights.

FIG. 13 illustrates the GTIR generation kernel.

FIG. 14 illustrates the GTIR peak isolation filter definition.

The presentation of the operating steps used in the present invention is made using program design language (PDL) in structured programming. These steps and procedures can be coded from PDL into FORTRAN, PASCAL, or other language usable for particular computers.

The computer to be used with the present invention is preferably selected as a digital computer with program execution speeds adequate to operate within the real time requirements of the platform or projectile. An example of one suitable computer is disclosed in copending application Ser. No. 07/077,717 filed Jul. 24, 1987, the parent application to this continuation-in-part.

DETAILED DESCRIPTION OF THE PREFERRED INVENTION

The present invention incorporates multiple independent hierarchical tracking algorithms using more than one tracking point of view to maintain target track as the target signature changes from one instant in time to the next. Tracking objects from more than one of view greatly increases tracking reliability under difficult tracking conditions. If some of the tracking viewpoints experience tracking difficulty leading to loss of lock on the target, reacquisition is readily achieved by using information from the remaining tracker(s) to automatically reacquire the target after the tracking difficulty has past.

Figure 1:
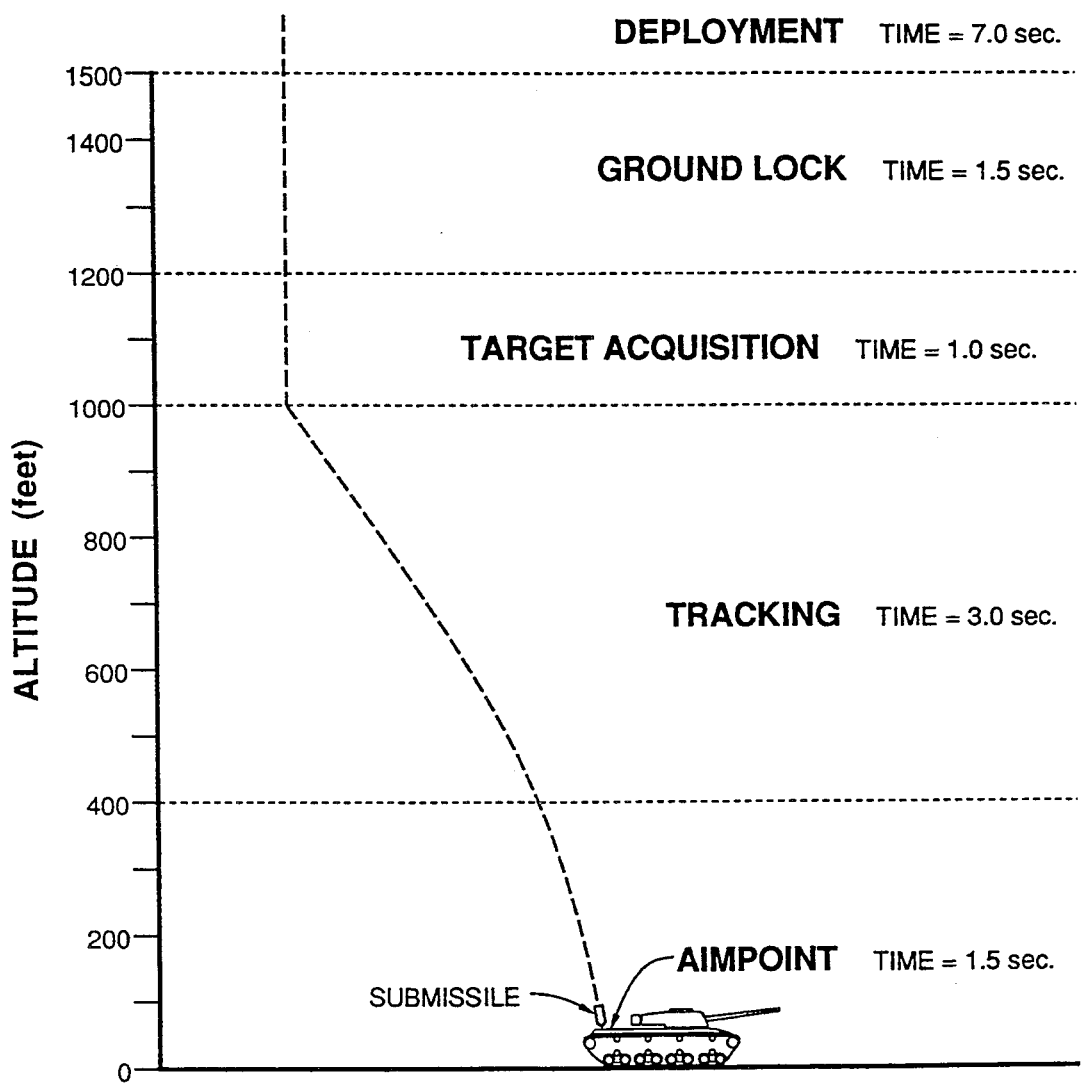
FIG. 1 is a exemplary time line for a "Smart" submissile.
Figure 5:
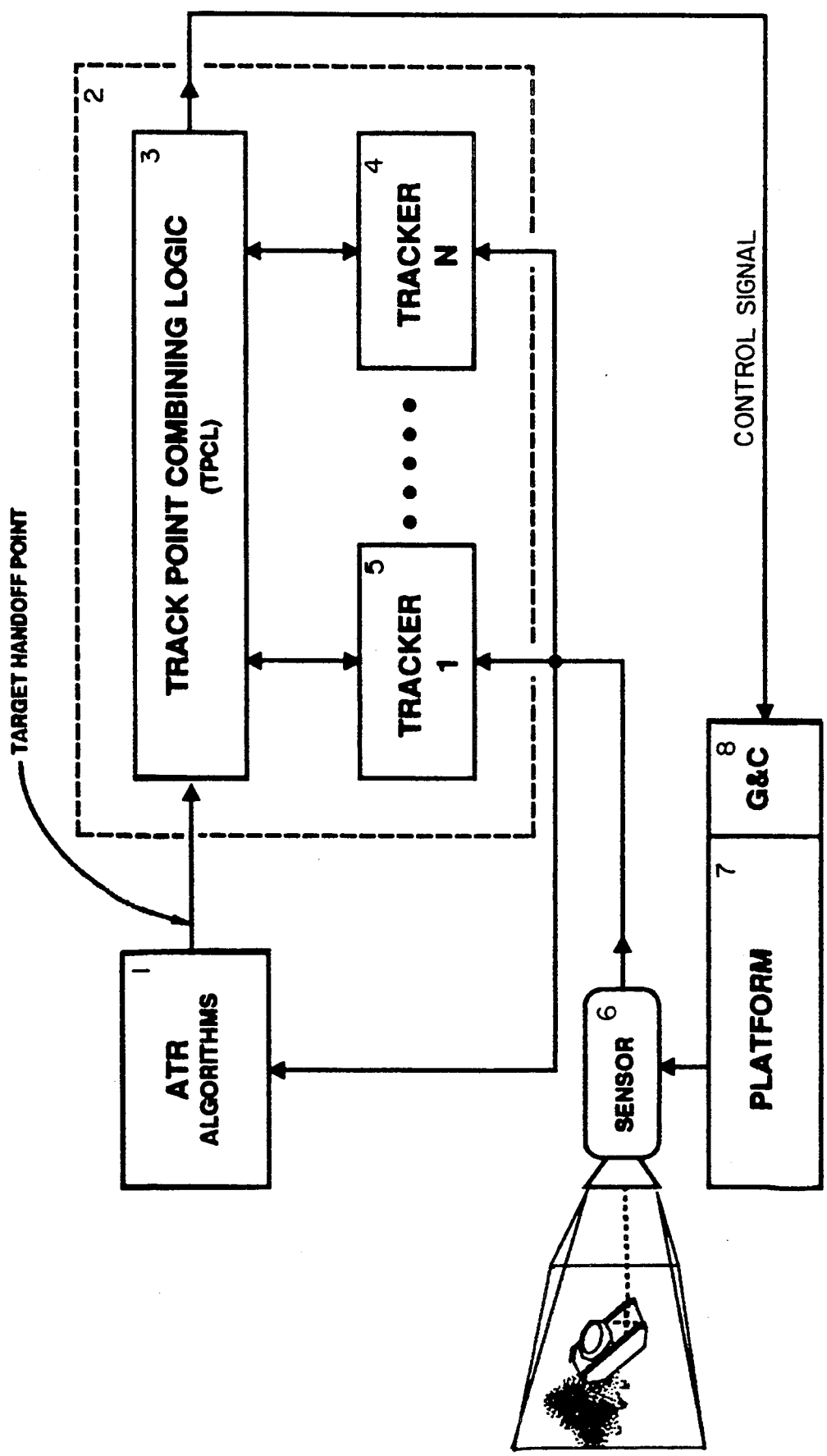
FIG. 5 is a block diagram of the overall hierarchical tracker.

An overall block diagram of the hierarchical tracker is shown in FIG. 5. By way of example, Automatic Target Recognizer (ATR) 1 provides the target handoff point which provides the initial condition for the Hierarchical Tracker 2 to initiate tracking.

Hierarchical Tracker 2 combines individual track point outputs from multiple independent target trackers 4 and 5 into a composite track point which is the basis for a control signal to Guidance and Control (G&C) unit 8 for platform 7. As the platform maneuvers, sensor 6 is caused to continuously point at the target by platform guidance corrections generated by G&C 8. This closed-loop tracking operation continues indefinitely in like manner.

Without a loss in generality, this invention will be described in terms of only two independent trackers tracking one independent target.

Referring to FIG. 5, specifically, Tracker 5 will take the form of a conventional Normalized Product Correlation (NPC) tracker, and Tracker 4 will take the form of a Generalized Target-to-Interference Ratio (GTIR) tracker.

Figure 6:
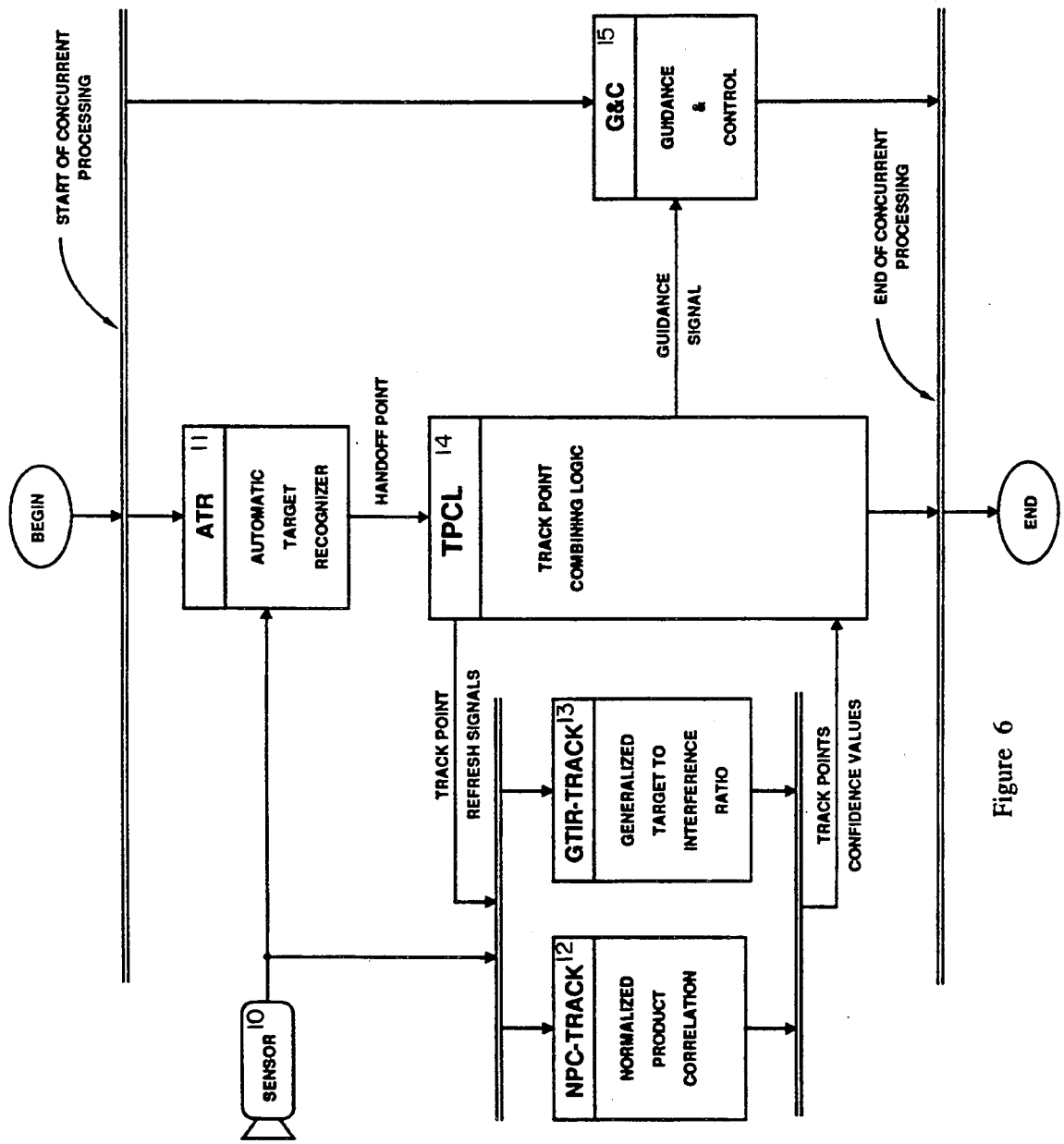
FIG. 6 is a block diagram of the data flow for a two tracker system.

A data flow diagram illustrating this "two tracker, one target" example is shown in FIG. 6. Sensor 10 provides imagery for ATR 11 which automatically locates a target of interest. This target is handed off to Track Point Combining Logic TPCL 14 which initiates the tracking operation.

TPCL spawns NPC_TRACK 12 and GTIR_TRACK 13 as two concurrent independent tracking tasks. These trackers accept sensor imagery from Sensor 10 and Track Point and Refresh Signals from TPCL 14. The two trackers individually and independently use this input information to locate the target in successive frames of imagery from Sensor 10. Trackers 12 and 13 each provide a track point and a track point confidence value to TPCL 14. TPCL 14 inturn generates a composite track point by conditionally combining the track point estimates from trackers 12 and 13 with the previous track point depending upon the confidence values associated with the new track point positions. TPCL 14 uses this composite track point to generate a guidance signal which is passed to Guidance and Control 15 for directing the platform to the newly determined target location. The details of TPCL 14 and Trackers 12 and 13 are now presented.

Track Point Combining Logic (TPCL)

In the hierarchical tracker (see FIG. 6), each tracking mode returns a list of candidate target locations along with their confidence values. The NPC tracker returns a single location with the highest peak using the correlation coefficient, while the GTIR tracker returns up to five tracked points.

The GTIR tracker performs the same functions as its acquisition algorithm in a dynamically updated and smaller search area instead of the entire image field of view. It keeps a record of the past history of its best tracked point. Based on a spatial threshold on target tracked locations between consecutive frames, a preliminary criterion of successful tracking can be established. The past history of the tracked points are then utilized to readjust the corresponding confidence measure to reflect how well the tracked target location and its displacement vector match the statistics of the desired target.

Similarly, the NPC tracker uses a search area centered at the most confident target location as reported by TPCL and locates the best match position employing the reference target template according to the coefficient of the normalized product correlation. The reference target template is acquired during target handoff and subsequently updated based on the TPCL report.

Figure 7:
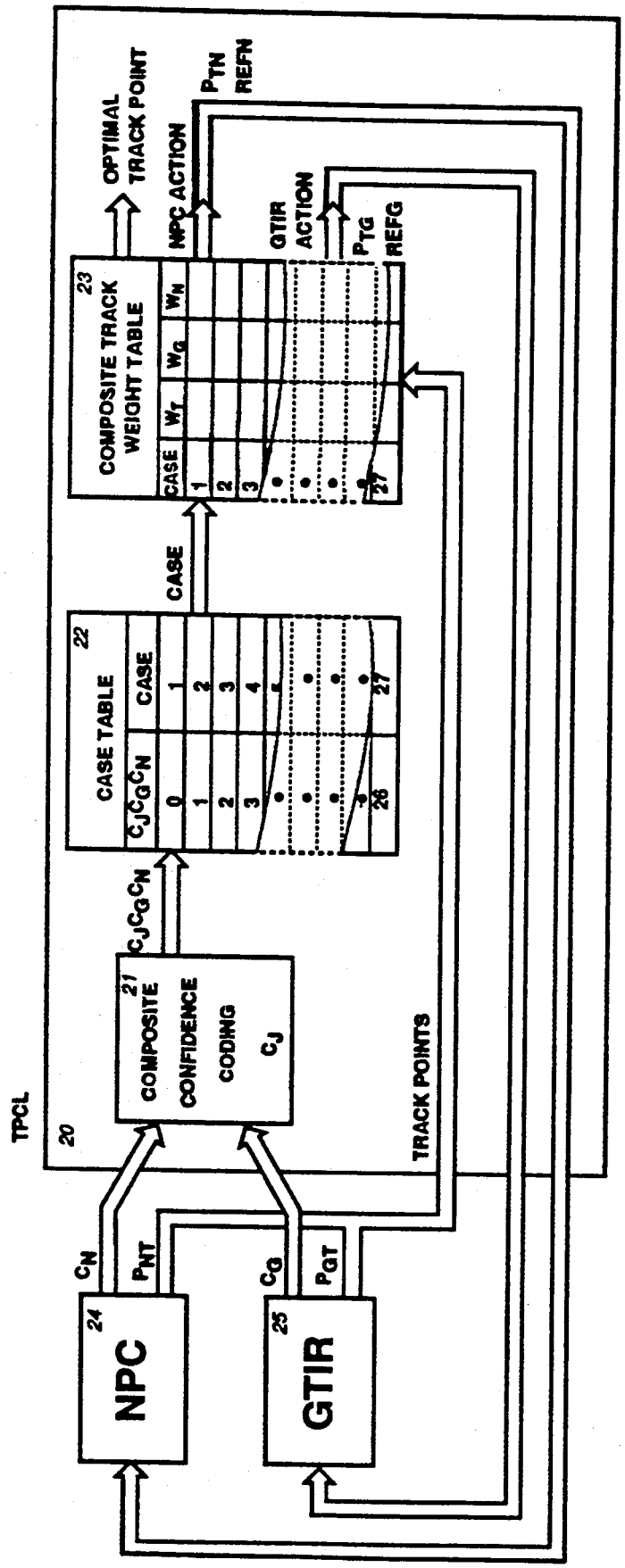
FIG. 7 is a block diagram of the algorithmic structure for the track point combining logic (TPCL).

The structure for the Track Point Combining Logic (TPCL) algorithm is given in FIG. 7. TPCL initializes itself when it receives the Handoff signal. At this point, TPCL enters its track mode. Two globally set parameters are the size of the search area for both GTIR and NPC and the size of the reference target template.

Once in the track mode, the NPC and GTIR trackers process the windowed data of the current image. When both finish processing, they report their result to TPCL which continuously accumulates the latest output from the NPC and GTIR trackers. Utilizing these target location inputs from the two separate tracking algorithms and any valid GTIR past history, TPCL selects the highest confidence GTIR target track location from the candidate list of GTIR track points and obtains a joint confidence measure for the tracked target between the two modes. Alternatively, TPCL can select the GTIR track point which maximizes the overall track point confidence.

The joint confidence measure, $C_J$, is assigned one of the three values described below:

1. $C_J=2$ when both trackers agree on a tracked position to within a specified maximum separation.
2. $C_J=1$ when both trackers do not agree on the tracked position but do agree on the relative motion of the target between the current and the last examined scene.
3. Otherwise, $C_J=0$.

According to the NPC coefficient, $\rho_{max}$, the NPC confidence measure, $C_N$, is assigned one of the three values described below.

1. Assign $C_N$ a value of 2 when $\rho_{max}>0.75$ and the change in the correlation coefficient between the present and the last time is less than or equal to 0.08.
2. Assign $C_N$ a value of 1 when $\rho_{max}>0.75$ and the change in the correlation coefficient between the present and the last time is greater than 0.08.
3. ELSE, assign $C_N$ a value of 0.

Similarly, the GTIR confidence measure for the top ranked track location, C(1), which ranges from 0 to 100, the GTIR confidence measure is assigned one of the three values described below.

$$C_G = C_G(1) = \begin{cases} 2, & C(1) > 65 \quad \text{High Confidence,} \\ 1, & 36 \leq C(1) \leq 65 \quad \text{Medium Confidence,} \\ 0, & C(1) \leq 36 \quad \text{Low Confidence.} \end{cases}$$

These three confidence measures are encoded into an integer which indexes the range [0–26]. This is achieved by treating each of the three confidence measures as one digit in the three-digit based-3 number, $C_J C_G C_N$. Allowable digits are {0,1,2}. For example, 002-base-3=2, 010-base-3=3, 100-base-3=9, 200-base-3=18, and 222-base-3=26. Refering again to FIG. 7, this joint confidence code is used to index into a table that specifies which one of the 27 cases TPCL should next proceed to. The 27 cases correspond to increasing track point confidence and are grouped as follows:

Handoff: Case 1. Handoff to NPC and GTIR trackers the designated track point.

Low Confidence: Cases 2-4. Two of the three track points are are of low confidence and the remaining track point is of medium confidence. The sum of the confidence values is 1.

Medium-Low Confidence: Cases 5-10. One of the track points is of high confidence and the remaining two track points are of low confidence, or two of the three track points are are of medium confidence and the remaining track point is of low confidence. The sum of the confidence values is 2.

Medium Confidence: Cases 11-17. All three track points are of medium confidence, or one of the track points is of low confidence, one is of medium confidence, and one is of high confidence. The sum of the confidence values is 3.

Medium-High Confidence: Cases 18-23. One of the track points is of low confidence and the remaining two track points are of high confidence, or two of the track points are of medium confidence and the third is of high confidence. The sum of the confidence values is 4.

High Confidence: Cases 24-27. Two of the three track points are of high confidence and the remaining one is of medium confidence, or all three track points are of high confidence. The sum of the confidence values is 5 or 6.

The mapping between the confidence index and the corresponding 27 action cases is shown in FIG. 8. The case-select code is then used to index into another set of tables which contain the weights used in the equation to calculate the new joint target track position, FIG. 9, $P_T = \{X_T, Y_T\}$, the NPC track position, FIG. 10, and GTIR track position, FIG. 11.

This table structure allows the flexibility to separately specify the joint target location of TPCL $P_T = \{X_T, Y_T\}$, the NPC new position $P_{TN} = \{X_N, Y_N\}$, and the GTIR new position $P_{TG} = \{X_G, Y_G\}$. However, in the present discussion, both the NPC and GTIR trackers receive the same joint target location from TPCL as an update for their new center of search.

Two parameters, F and K are incorporated into FIG. 9 for used in conjunction with the other values to "tune" the TPCL logic.

$$F, K = \begin{cases} 1.0, & \text{Ignore Higher Confidence Track Point,} \\ 0.5, & \text{Average of Higher +} \\ & \text{Lower Confidence Track Points,} \\ 0.0, & \text{Ignore Lower Confidence Track Point.} \end{cases}$$

Values of ½ for F and K correspond to weighting the higher confidence track point twice as much as the lower confidence track point to yield the new track point position. The weights supplied in the table can be assigned as needed to accomodate the particular characteristics of the tracking problem at hand. Other values allows one to emphasize the track point data (new updates and previous updates) to a greater or lesser extent. The seven variables in FIG. 9 are used as follows:

$P_N$ weight for the new correlation position,
$P_{NO}$ weight for the old correlation position,
$P_G$ weight for the new TIR position,
$P_{GO}$ weight for the old TIR position,
$P_{TO}$ weight for the old joint TPCL position,
$P_D$ weights for the target displacement, DT divisor for the product of a scale factor and the sum of the above weights.

This weight implements the ability to coast when track loss becomes imminent and when reacquisition is needed.

In those situations where a very high confidence measure from one tracker contrasts with a very low confidence measure from the other tracker, the joint target location is supplied by the tracker with the higher confidence measure. When both trackers present equal confidence measures, the average of the separate target positions is used as the joint target location. When a high confidence measure and a medium confidence measure are received by TPCL, the joint target location is computed with weights of 2:1, the larger weight being given to the higher confidence target location.

While TPCL loops in consecutive tracking frames, the refresh signal of the trackers will be determined by the array of weight entries selected by the active TPCL case. When refresh occurs, the effected tracker will operate on the new data being sent by the sensor.

When both trackers fail for an extended period of time, the GTIR tracker becomes a target detector for reacquisition while the NPC tracker tries to match the data residing in its reference target template.

PROCEDURE TPCL (Track Point Combining Logic)

INPUTS

| | INPUTS |
|---|---|
| $P_H$ | = $\{X_H, Y_H\}$ = Handoff location from ATR |
| Template T | = ATR Target Template (Pixel map of target of size $\{W_0\}$) |
| $W_S$ | = {Width,Height}, search window size based on target ground speed |
| | Example |
| | $W_S \approx \Delta T V_{max} + \frac{1}{2} a_{max} \Delta T^2$ |
| | $\Delta T$ = Tracker update interval (seconds) |
| | $V_{max}$ = Max target speed (ft/sec) |
| | $A_{max}$ = Max target acceleration (ft/sec$^2$) |
| | For: $\Delta T$ = .1 Second, sensor resolution = 1 ft/pixel |
| | $V_{max}$ = 44 ft/sec (30 mph) |
| | $a_{max}$ = 32 ft/sec$^2$ (1 g deceleration) |
| | $W_S$(width,height) = (4.56 ft, 4.56 ft) per pixels |
| $T_S$ | = {Width,Height} of template window from ATR ($\simeq$ target size) |
| $P_{NT}$ | = $\{X_{NT}, Y_{NT}\}$ = NPC tracker location |
| $C_N$ | = NPC confidence value |
| $P_{GT}$ | = $\{X_{GT}(i), Y_{GT}(i)\}$, (i = 1,...,5) = GTIR tracker locations |
| $C_G$ | = $\{C_G(i)\}$, (i = 1,...,5) = GTIR confidence values |
| | OUTPUTS |
| $P_{TT}$ | = $\{X_{TT}, Y_{TT}\}$ = composite TPCL track point |
| $P_{TN}$ | = $\{X_{TN}, Y_{TN}\}$ = composite NPC track point |
| $P_{TG}$ | = $\{X_{TG}, Y_{TG}\}$ = top ranked composite GTIR track point |
| REFN | = {0,1} = NPC Refresh Signal (0 = NO REFRESH, 1 = REFRESH) |
| REFG | = {0,1} = GTIR Refresh Signal |

BEGIN PROCEDURE TPCL (see FIG. 7)

BEGIN TPCL_HANDOFF

1. Input: $P_H$, Template T, $W_S$, $T_S$ from ATR and $R_0$ from G&C.
2. Set $P_{TT} = P_{NT} = P_{GT} = P_H$ (Initialize TPCL, NPC and GTIR tracker to target handoff location).
3. Set REFN = REFG = 1 (Refresh both trackers).
4. Update internal variables:

$P_2=P_4=P_5=P_6=P_7=P_H$.

5. Execute procedures: NPC_TRACK, GTIR_TRACK.

END TPCL_HANDOFF
BEGIN TPCL_TRACKING
BEGIN TPCL_TRACKER-LOOP

1. Estimate the position, $P_S$, of the sensed template from the previous track point location, $P_S=\{X_S,Y_S\}$, $X_S=X_{TT}+\dot{X}_{TT}\Delta T$, $Y_S=Y_{TT}+\dot{Y}_{TT}\Delta T$, where, $\Delta T$=elapse time in seconds between reference image $I_0$ and sensed image $I_S$.

2. Input from G&C the slant range, $R_S$, to the track point.

3. Estimate the track gate size, $G_S$, due to range induced growth (shrinkage):

$\{W_0, H_0\}$ and $R_0$ = Input values specified at handoff, $G_S = \{H_S, W_S\}$, $H_S = H_0 \dfrac{R_0}{R_S}$ = Height of track gate, $W_S = W_0 \dfrac{R_0}{R_S}$ = Width of track gate.

4. Estimate the uncertainty in target location due to self motion of the target and apparent target movement due to platform velocity measurement errors.
   (a) Target self motion is a priori information about the target being tracked. Worst case estimates are derived based upon the maximum speed and acceleration obtainable by the target.

$d_T=[V_{max}\Delta T+(\frac{1}{2})A_{max}(\Delta T)^2]/(R\beta)$, where, $d_T$=maximum distance in pixels the target can travel, $\Delta T$=time in seconds since last known position, $V_{max}$=maximum target velocity in ft/sec, $A_{max}$=maximum target acceleration in ft/sec$^2$.

(b) Platform velocity measurement errors are expressed as a percentage, $\epsilon_P$, of platform velocity $V_0=\{\dot{X},\dot{Y}\}$.

$\Delta P_X=\epsilon_P\dot{X}_0\Delta T$ in pixels, $\Delta P_Y=\epsilon_P\dot{Y}_0\Delta T$ in pixels.

(c) Compute worst case target location uncertainty, L, $L=\{d_T+\Delta P_X, d_T+\Delta P_Y\}$.

5. Calculate the search neighborhood, $\Omega$, to be those pixels in the rectangular region bounded by:

$\Omega$=Maximum Rectangule($P_S\pm L$), $X_P-L_X\leq\Omega_X\leq X_P+L_X$, $Y_P-L_Y\leq\Omega_Y\leq Y_P+L_Y$.

6. Update Internal Variables $P_2 \leftarrow P_{NO} \leftarrow P_{NT}\{X_{NT}, Y_{NT}\}$ = Previous NPC Track Point, $P_4 \leftarrow P_{GO} \leftarrow P_{GT}\{X_{GT}, Y_{GT}\}$ = Previous GTIR Track Point, $P_7 \leftarrow P_5$     Save Previous TPCL State, $P_5 \leftarrow P_{TO} \leftarrow P_{TT}\{X_{TT}, Y_{TT}\}$ = Save TPCL Track Point.

7. Execute Procedures NPC_TRACK, GTIR_TRACK.

8. Input: $P_{NT}=\{X_{NT},Y_{NT}\}$NPC TRACK_POINT Input: $P_{GT}=\{X_{GT},Y_{GT}\}$=Top ranked GTIR TRACK_POINT Input: $C_N$, NPC_TRACK confidence value Input: $C_G$, GTIR_TRACK confidence value.

9. Calculate Relative Target Movement Between NPC and GTIR $\dot{X}_N = (X_{TO} - X_{NT})/\Delta T$ = NPC Target Velocity in X $\dot{Y}_N = (Y_{TO} - Y_{NT})/\Delta T$ = NPC Target Velocity in Y $\dot{X}_G = (X_{TO} - X_{GT})/\Delta T$ = GTIR Target Velocity in Y $\dot{Y}_G = (Y_{TO} - Y_{GT})/\Delta T$ = GTIR Target Velocity in Y $\Delta T$ = Tracker Update Time (time between sensed images)

$V_{NG} = \sqrt{(\dot{X}_N - \dot{X}_G)^2 + (\dot{Y}_N - \dot{Y}_G)^2}$

= Relative velocity differences between NPC and GTIR track points.

Calculate NPC_GTIR Track Point Separation Distance, $D_{NG} = \sqrt{(X_{NT} - X_{GT})^2 + (Y_{NT} - Y_{GT})^2}$.

10. Calculate predicted track point location, assuming uniform target motion.
    (a) IF ($C_N\neq 0$ OR $C_T\neq 0$) THEN: (at least one tracker is locked on).

$\dot{V}_T=(P_5-P_7)/\Delta T$ $\dot{X}_T=(X_5-X_7)/\Delta T$ (TPCL velocity X direction,)

$\dot{Y}_T=(Y_5-Y_7)/\Delta T$ (TPCL velocity Y direction).

END IF
    (b) Update motion compensated TPCL track point locations:

$P_D=\{X_D,Y_D\}$ $X_D=X_{TT}+\dot{X}_T\Delta T$ $Y_D=Y_{TT}+\dot{Y}_T\Delta T$

11. Calculate Joint Tracker Confidence, $C_J$.
    Internal Parameters:

MAXSEP=Maximum Separation Threshold,

MAXVEL=Maximum Velocity Difference, $C_J$=Joint Confidence.

IF ($D_{NG} \leq$ MAXSEP) THEN $C_J$=2 (High confidence if track points are close).
ELSE IF ($V_{NG}<$MAXVEL) $C_J$=1 (Medium confidence if track points are not diverging).
ELSE $C_J$=0 (Low confidence if track points don't match and they are diverging).
END IF 12. Calculate Composite confidence index:

$$\text{index} = C_N + 3C_G + 9C_J = \{0..26\}.$$

13. Table Look-up to select Processing Decision (see FIG. 8),

TPCL_CASE=CASE_TABLE(index)={1..27}.

14. Calculate Composite TPCL Track Point, $P_{TT}=\{X_{TT},Y_{TT}\}$. This calculation is applied twice—once for the X-coordinate and once for the Y-coordinate.

$$P_{TT} = \frac{\sum_{i=1}^{6} P_i W_T((\text{Case}), i)}{W_T(\text{Case}, 7)},$$

where,
$P_i = P_i(X,Y) =$ Track Point $P_1 \rightleftharpoons P_N =$ New NPC Track Point $P_2 \rightleftharpoons P_{N0} =$ Previous NPC Track Point $P_3 \rightleftharpoons P_G =$ New GTIR Track Point $P_4 \rightleftharpoons P_{G0} =$ Previous GTIR Track Point $P_5 \rightleftharpoons P_{T0} =$ Previous TPCL Track Point $P_6 \rightleftharpoons P_D =$ New TPCL Track Point $W_T(i,j) =$ Table of Weights (see FIG. 9), K and F are "tuning" parameters.

15. Calculate Composite NPC Track Point, $P_{TN}=\{X_{TN},Y_{TN}\}$, see FIG. 10, $$P_{TN} = \frac{\sum_{i=1}^{6} P_i W_N((\text{Case}), i)}{W_N(\text{Case}, 7)}.$$

16. Calculate Composite GTIR Track Point, $P_{TG}=\{X_{TG},Y_{TG}\}$, see FIG. 11, $$P_{TG} = \frac{\sum_{i=1}^{6} P_i W_G((\text{Case}), i)}{W_G(\text{Case}, 7)}.$$

17. Determine Tracker Refresh Status,

REFN=$W_N$(8,TPCL_CASE) (Column 8 of weight table),

REFG=$W_G$(8,TPCL_CASE).

18. Generate G&C track point error signal, $\Delta P = P_{TT} - P_0$.

19. Output $\Delta P$ to inform the platform that the target has changed location from $P_0$ to $P_T$, in sensor coordinates. The platform, according to its guidance law, will generate a sensor pointing response which tends to position the track gate in the center of the sensor's field of view. This update response is usually much longer than $\Delta T$.
END TPCL_TRACKER LOOP
END PROCEDURE TPCL Normalized Product Correlation (NPC) Tracker The algorithmic details for the Normalized Product Correlation (NPC) tracker (identifier 12, FIG. 6) are now presented.

Procedure NPC_TRACK

Inputs:

$P_{TN} = \{X_N, Y_N\}$ Composite TPCL Track Point

REFN = {0, 1} Template Refresh Signal $W_S$ = {Width, Height} of Search Window $G_S$ = {Width, Height} of Track Gate Internal Variables:

$C_C$ = Current Correlation Coefficient $C_P$ = Previous Correlation Coefficient $C_D = C_C - C_P$ Change in Correlation Coefficient Outputs:

$P_{NT} = \{X_{NT}, Y_{NT}\}$ NPC Track Point $C_N$ = NPC Confidence value

BEGIN Procedure NPC_TRACK
1. Input track point $P_{TN}=\{X_N,Y_N\}$ in sensor coordinates.
2. Input track gate $G_S=\{H_S,W_S\}$ in sensor coordinates.
IF (REFN=1) THEN: (Refresh the reference templates)

BEGIN Refresh: (see FIGS. 2 and 3)
1. Input Sensed Image, $I_0$.
2. Extract from $I_0$, a reference tracking template $T_R$ of size $G_S$ centered at $P_{TN}$.
3. Set track point, $P_T=P_{TN}$.
4. Set $C_C=C_P=C_D=0$ (Initialize internal variables.)
5. Return results to TPCL:
   (a) $P_{NT}=P_T\{X_N,Y_N\}$ (NPC Track Point Location.)
   (b) $C_N=2$ (High Confidence in Track Point Location.)
END Refresh
ELSE IF (REFN=0) THEN: (Track)

BEGIN NPC Tracking Update: (see FIG. 4)
1. Input Sensed Image, $I_S$.
2. Set $P_T=P_{TN}$; $\rho_{max}=0$.
3. Input the search neighborhood, $\Omega$ (see TPCL 5).
4. FOR, {X,Y} in neighborhood $\Omega$, LOOP: (Find best match).
   (a) Extract from $I_S$ a sensed tracking template, $T_S$, of size $G_S$ centered at {X,Y}.

(b) Compute the similarity between $T_S$ and $T_R$ using Normalized Product Correlation (NPC):

$$\rho = \frac{Cov(T_S, R_S)}{\sigma_T \sigma_S + \epsilon} = \text{Correlation Coefficient.}$$

5. IF $\rho > \rho_{max}$ THEN: (a better match is found)

$P_{TN} = \{X,Y\}$ = coordinates of the better match.

$\rho_{max} = \rho$ = correlation coefficient of better match

Figure 12:
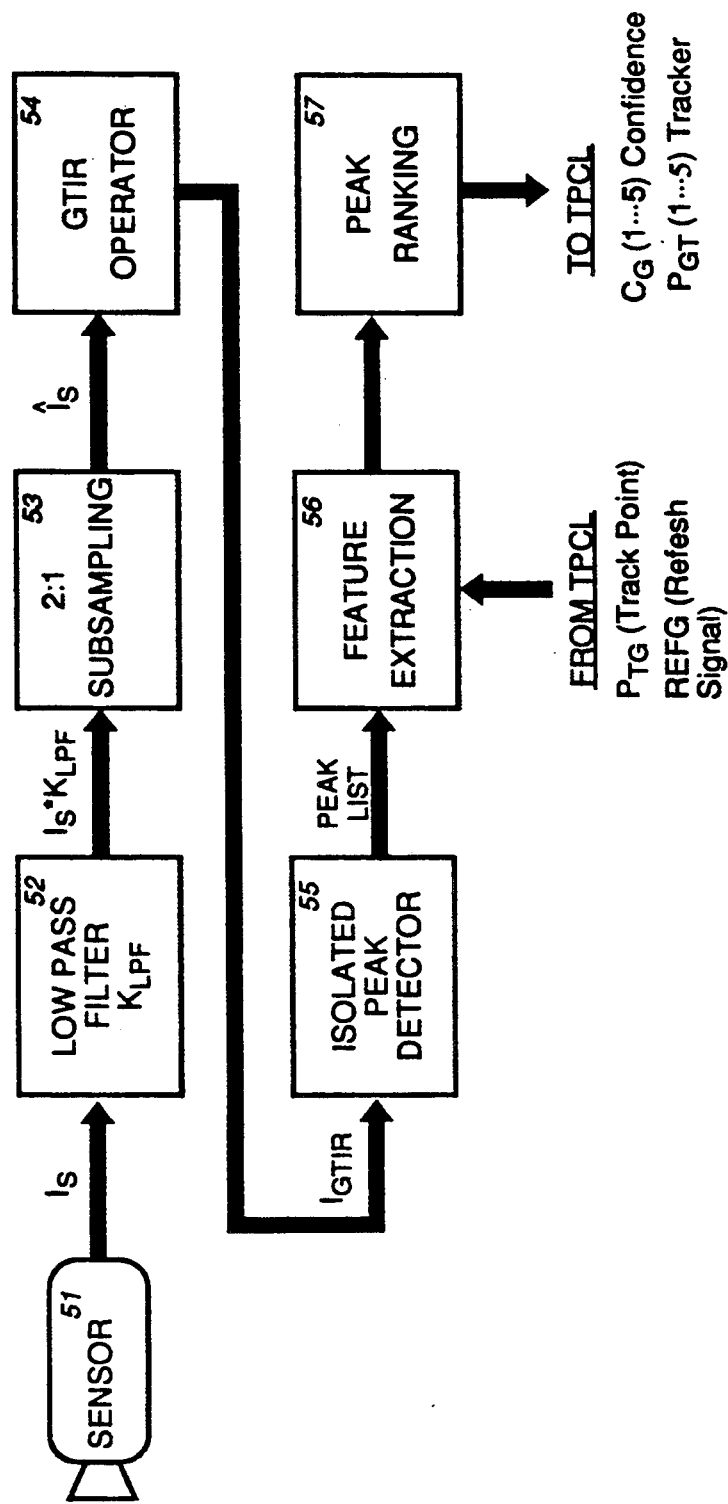
FIG. 12 is a block diagram of the generalized target to interference ratio (GTIR) algorithm structure.

END IF
END FOR-LOOP (Find best match.)
6. Calculate NPC Confidence Value
  (a) $C_C = \rho_{max}$ = Current Correlation Coefficient
  (b) $C_D = C_C - C_P$ = Change in Correlation Coefficient
  (c) IF ($C_C \geq .75$) and ($C_D \leq .08$) THEN $C_N = 2$: (High confidence.)
    ELSE IF ($C_C \geq .75$) and ($C_D > .08$) THEN $C_N = 1$: (Medium confidence.)
    ELSE $C_N = 0$: (lost track.)
    END IF
  (d) $C_P = C_C$ (Update last correlation coefficient value.)
7. Return NPC results to TPCL:
  (a) $P_{NT} = \{X_{NT}, Y_{NT}\}$ = NPC Track Point of maximum $\rho$.
  (b) $C_N$ = NPC Confidence Value.
END NPC Tracking Update
END IF Track
END Procedure NPC_TRACK Generalized Target to Interference Ratio (GTIR) Tracker The GTIR tracker exploites the target finding capability of the GTIR operator as the basis for tracking target-like objects in a dynamically changing environment. The overall algorithm structure is shown in FIG. 12.

Imagery from sensor 51 is convolutionally low pass filtered 52 with a 3×3 kernel, $K_{LPF}$, of the following form, $$K_{LPF} = \frac{1}{16} \begin{vmatrix} 1 & 2 & 1 \\ 2 & 4 & 2 \\ 1 & 2 & 1 \end{vmatrix}.$$

This filter reduces input sensor noise. Subsampler 53 subsamples the input image, $I_S$, by a factor of 2:1 along the rows and the columns, producing an output image, $\hat{I}_S$, of half the spatial dimensions of $I_S$ and one fourth the number of pixels.

$$I_S * K_{LPF} \xrightarrow[\text{Subsample}]{2:1} \hat{I}_S.$$

This lowpass filtering and spatial reduction 52, 53 improves the computation time for the subsequent GTIR computations by a factor of 4. However, all applications may not require these processing steps. For this description, targets are assumed to be about 12 pixels in length before subsampling. If the spatial filtering and reduction is omitted, the subsequent GTIR kernel should be spatially scaled accordingly.

The filtered and reduced image, $\hat{I}_S$, is convolutionally processed by GTIR Operator 54, generating a GTIR map whose pixel intensities are a matched filter measure of target energy with respect to its surrounding background. This operator is defined as follows:

$$I_{GTIR} = \hat{I}_S * K$$

where, $\hat{I}_S$ = Reduced 2:1 Input sensor image,

* = Generalized convolution, $K$ = GTIR convolutional kernel (see FIG. 13), $$= \frac{|\mu_T - \mu_B|}{\sigma_B},$$

$\mu_T$ = Mean of target pixels, $\mu_B$ = Mean of background pixels, $\sigma_B$ = Standard deviation of background pixels.

An output pixel of the GTIR map is generated by centering the GTIR kernel, K, over the corresponding input image pixel, $I_S$, and performing the GTIR calculation defined above. This procedure is performed on all pixels within the search area.

The GTIR map is processed by Peak Detector 55 to find isolated peaks in the GTIR map corresponding to locations associated with high target likeness. Isolated peaks are found by comparing the maximum GTIR value found in a 5-pixel by 5-pixel neighborhood against the maximum over a set of 8 numbers which correspond to the minimum GTIR values along 8 radially symmetric arms 4-pixels in length, see FIG. 14.

$$G_{max}(i, j) = \max[I_{GTIR}(i + k, j + m)],$$
$$(k, m = -2, \ldots, 2)$$

$A_k = \min[\alpha_{k1}, \alpha_{k2}, \alpha_{k3}, \alpha_{k4}], k = 1, \ldots, 8$ k of 8 radially symmetric arms centered at pixel $(i, j)$.

Each arm is 4-pixels in length, see FIG. 14.

$A_k$ is the minimum of these 4-pixel Values.

$A_{max}(i, j) = \max[A_1, A_2, A_3, A_4, A_5, A_6, A_7, A_8]$
$= A_{max}$ evaluated at pixel $(i, j)$.

$I_G(i, j) = G_{max}(i, j) - A_{max}(i, j)$, Isolation Parameter.

$I_G(l) = $ Isolation parameter associated with the l-th isolated peak.

IF $I_G(i,j) > I_T$ THEN: (Isolated peak found.

Save it as $I_G(l)$, the l-th isolation peak found.

$I_T$ = Isolation Threshold ≈ 40.)

ELSE: (Not an isolated peak at pixel (i,j).)
END IF

For each isolated peak, six features are computed, 56. The six features are defined in terms of the following measures:

$$D_S = \frac{W_S(\text{Width}) + W_S(\text{Height})}{2},$$

Distance from upper left hand corner of Search window to the center of the search space window, $P_l$ = Location of the $l$-th Isolated Peak, $P_{last}$ = GTIR's top ranked tracked track location last reported to TPCL, $P_{TG}$ = TPCL's track point location input to GTIR_TRACK, $D_{Gl}$ = Distance separating $l$-th peak location from $P_{last}$,
= $|P_l(X) - P_{last}(X)| + |P_l(Y) - P_{last}(Y)|$ $D_{Tl}$ = Distance separating $l$-th peak location from $P_{TG}$,
= $|P_l(X) - P_{TG}(X)| + |P_l(Y) - P_{TG}(Y)|$.

$L_1$ = Tuning parameter associated with Feature 3, $L_1 \approx 100$.

$L_2$ = Tuning parameter associated with Feature 4, $L_2 \approx 100$ $L_3$ = Tuning parameter associated with Feature 5, $L_3 \approx 1$.

$I_T$ = Isolation Threshold (40).

$I_G(l)$ = Isolation Parameter for $l$-th peak.

$I_{max}$ = Full Scale Isolation value (190).

$G_{FS}$ = GTIR full scale amplitude value (255).

The following six features are calculated for each entry on the "isolated peak" list, the general entry being denoted by l.

Feature 1: Percent of search space distance separating current peak from top ranked peak last reported to TPCL, $$F_1(l) = 100 \frac{D_S - D_{Gl}}{D_S}.$$

Feature 2: Percent of search space distance separating current peak from TPCL's input track point, $$F_2(l) = 100 \frac{D_S - D_{Tl}}{D_S}.$$

Feature 3: Amplitude of peak in percent of full scale, $$F_3(l) = 100 \frac{G_{max}(l) - L_1}{G_{FS} - L_1}.$$

Feature 4: Percent change in $G_{max}$, from last top ranked GTIR peak, $$F_4(l) = 100 \frac{G_{max}(\text{last}) - L_2|G_{max}(l) - G_{max}(\text{last})|}{G_{max}(\text{last})}.$$

Feature 5: Peak Isolation, Percent of full scale, $$F_5(l) = 100 \frac{I_G(l) - I_T}{I_{max} - L_3 I_T}.$$

Feature 6: Percent change in isolation parameter between current peak and last top ranked GTIR peak, $$F_6(l) = 100 \frac{I_T - |I_{last} - I_G(l)|}{I_T}.$$

A normalized confidence value is assigned to each peak based upon a weighted summation of the six features, 57. The weights are tuning parameters, which may vary acording to the application.

$$C(l) = \sum_{j=1}^{6} W_{REFG}(j) F_j(l) = (\text{Normalized Confidence Value}),$$

where,

| j | REFG = 1 | REFG = 2 | REFG = 3 |
|---|---|---|---|
| 1 | 0.00 | 0.35 | 1.00 |
| 2 | 0.50 | 0.15 | 0.00 |
| $W_{REFG}(j) =$ 3 | 0.25 | 0.20 | 0.00 |
| 4 | 0.00 | 0.05 | 0.00 |
| 5 | 0.25 | 0.15 | 0.00 |
| 6 | 0.00 | 0.10 | 0.00 |
| Σ | 1.00 | 1.00 | 1.00 |

$$\text{REFG} = \begin{cases} 1, & \text{Handoff and Acquisition,} \\ 2, & \text{Update track point using all data,} \\ 3, & \text{Update track point using position data only.} \end{cases}$$

The five largest peaks are selected 57 in decending order by their normalized confidence values. Peaks within $D_K \approx 3$ pixels of previously selected peaks are excluded from further selection. The selected peaks are quantized into three levels, $$C_G(l) = \begin{cases} 2, & C(l) > 65 & \text{High Confidence,} \\ 1, & 36 \leq C(l) \leq 65 & \text{Medium Confidence,} \\ 0, & C(l) \leq 36 & \text{Low Confidence.} \end{cases}$$

The top five peaks, $P_{GT}(1, \ldots, 5)$, and their associated confidence values, $C_G(1, \ldots, 5)$, are reported to TPCL.

The algorithmic details for the Generalized Target To Interference Ratio (GTIR) tracker (identifier 13, FIG. 6) are now presented.

Procedure GTIR_TRACK

| Inputs: | |
|---|---|
| $P_{TG}$ | = {$X_{TG}, Y_{TG}$} Composite TPCL Track Point. |
| $I_S$ | = Input Image. |
| REFG | = {0,1} Refresh Signal. |
| $W_S$ | = {Width,Height} of Search Window. |
| Internal Variables: | |
| $C(1, \ldots, N)$ | = Normalized Confidence List, length N. |
| $\hat{I}_S$ | = Filtered and reduced image. |
| $G_{max}(1, \ldots, N)$ | = Maximum GTIR list for detected peaks. |
| $I_G(1, \ldots, N)$ | = Isolation Parameter list for detected peaks. |
| $P_{last}$ | = Location, last reported top ranked track. |
| $C_G(\text{last})$ | = Confidence, last top ranked track. |
| $G_{max}(\text{last})$ | = $G_{max}$, last top ranked track. |
| $I_{last}$ | = Isolation Parameter, last top ranked track. |
| Outputs: | |
| $P_{GT}(1, \ldots, 5)$ | = {$X_{GT}, Y_{GT}$} GTIR Track Points. |
| $C_G(1, \ldots, 5)$ | = GTIR Confidence values. |

BEGIN PROCEDURE GTIR_TRACK (see FIG. 12)

1. Input track point $P_{TG}=\{X_G,Y_G\}$ in sensor coordinates.
2. Input Search Window $W_S=\{H_S,W_S\}$ in sensor coordinates.
3. Input REFG=refresh signal.
4. Input Sensor Image, $I_S$.
5. Save previous GTIR results for top peak.

$P_{last}=P_{GT}(1)$, $C_G(\text{last})=C_G(1)$,
$G_{max}(\text{last})=G_{max}(1)$, $I_{last}=I_G(1)$.

6. Compute GTIR map, $I_{GTIR}$.
   (a) Convolutionally low pass filter $I_S$ with kernel, K and subsample by 2:1 in both spatial dimensions.

$$K_{LPF} = \frac{1}{16}\begin{vmatrix}1 & 2 & 1\\ 2 & 4 & 2\\ 1 & 2 & 1\end{vmatrix}.$$

(b) Compute GTIR map by convolving GTIR kernel, FIG. 13, with the subsampled image $\hat{I}_S$.
7. Search each pixel of $I_S$ for location of possible peak. l=0 (initalize peak list pointer.) FOR {i,j} in $I_S$, LOOP: (to find peaks.)
   (a) Compute $G_{max}$, $G_{max}(i,j)=\max[I_{GTIR}(i+k,j+m)]$, $(k,m=-2,\ldots,2)$.

(b) Compute $A_k$, $k=1,\ldots,8$, $A_k=\min[a_{k1},a_{k2},a_{k3},a_{k4}]$, $k=1,\ldots,8$ k of 8 radially symmetric arms centered at pixel (i,j). Each arm is 4-pixels in length, see FIG. 14. $A_k$ is the minimum of these 4-pixel values.
   (c) Compute $A_{max}(i,j)$, $A_{max}(i,j)=\max[A_1,A_2,A_3,A_4,A_5,A_6,A_7,A_8]$ (d) Compute Isolation Parameter, $I_G(i,j)$, $I_G(i,j)=G_{max}(i,j)-A_{max}(i,j)$ (e) IF $I_G(i,j)>I_T$ THEN: (isolated peak found)

$l=l+1$ (index to l-th peak in peak list,)

$P_l=\{i,j\}$ (pixel location of l-th peak,)

$I_G(l)=I_G(i,j)$ (save isolation parameter,)

$G_{max}(l)=A_{max}(i,j)$ (save peak GTIR value.)

ELSE: (Not an isolated peak at pixel {i,j}.)
   END IF
   END FOR-LOOP (to find peaks.)
   N=l (the number of peaks found.)
8. Calculate the six track comparison features as a function of REFG. IF N=0 THEN: (no peaks found.)

$I_G(1,\ldots,5)=C_G(1,\ldots,5)=P_{GT}(1,\ldots,5)=0$

Return tracking data, $C_G(1,\ldots,5)$ and $P_{GT}(1,\ldots,5)$ to TPCL.

Exit GTIR_TRACK and return control to TPCL
ELSE: (more then one peak found, compute feature vectors.)
   (a) FOR l =1 to N LOOP: (over peaks)

$$D_S = \frac{W_S(\text{Width}) + W_S(\text{Height})}{2},$$

$P_{GT}$ = GTIR's top ranked tracked track location last reported to TPCL, $P_{TG}$ = TPCL's track point location input to GTIR_TRACK, $D_{Gl}$ = Distance separating l-th peak location from $P_{last}$,
    = $|P_l(X) - P_{last}(X)| + |P_l(Y) - P_{last}(Y)|$ $D_{Tl}$ = Distance separating l-th peak location from $P_{TG}$,
    = $|P_l(X) - P_{TG}(X)| + |P_l(Y) - P_{TG}(Y)|$.

$L_1$ = Tuning parameter associated with Feature 3, $L_1 \approx 100$.

$L_2$ = Tuning parameter associated with Feature 4, $L_2 \approx 100$ $L_3$ = Tuning parameter associated with Feature 5, $L_3 \approx 1$.

$I_T$ = Isolation Threshold (40).

$I_G(l)$ = Isolation Parameter for l-th peak.

$I_{max}$ = Full Scale Isolation value (190).

$G_{FS}$ = GTIR full scale amplitude value (255).

Feature 1: Percent of search space distance separating current peak from top ranked peak last reported to TPCL, $$F_1(l) = 100\,\frac{D_S - D_{Gl}}{D_S}.$$

Feature 2: Percent of search space distance separating current peak from TPCL's input track point, $$F_2(l) = 100\,\frac{D_S - D_{Tl}}{D_S}.$$

Feature 3: Amplitude of peak in percent of full scale, $$F_3(l) = 100\,\frac{G_{max}(l) - L_1}{G_{FS} - L_1}.$$

Feature 4: Percent change in $G_{max}$ from last top ranked GTIR peak, $$F_4(l) = 100\,\frac{G_{max}(\text{last}) - L_2|G_{max}(l) - G_{max}(\text{last})|}{G_{max}(\text{last})}.$$

Feature 5: Peak Isolation, Percent of full scale, $$F_5(l) = 100 \frac{I_G(l) - I_T}{I_{max} - L_3 I_T}.$$

Feature 6: Percent change in isolation parameter between current peak and last top ranked GTIR peak, $$F_6(l) = 100 \frac{I_T - |I_{last} - I_G(l)|}{I_T}.$$

(b) Compute normalized confidence value for each peak.

$$C(l) = \sum_{j=1}^{6} W_{REFG}(j) F_j(l) = \text{Normalized Confidence Value},$$

where, $$W_{REFG}(j) = \begin{array}{c|ccc} j & REFG=1 & REFG=2 & REFG=3 \\ \hline 1 & 0.00 & 0.35 & 1.00 \\ 2 & 0.50 & 0.15 & 0.00 \\ 3 & 0.25 & 0.20 & 0.00 \\ 4 & 0.00 & 0.05 & 0.00 \\ 5 & 0.25 & 0.15 & 0.00 \\ 6 & 0.00 & 0.10 & 0.00 \\ \hline \Sigma & 1.00 & 1.00 & 1.00 \end{array}$$

$$REFG = \begin{cases} 1, & \text{Handoff and Acquisition,} \\ 2, & \text{Update track point using all data,} \\ 3, & \text{Update track point using TPCL position data only.} \end{cases}$$

END FOR-LOOP (over peaks)
END IF (peak check)
9. Compute confidence values for five largest peaks greater than $D_K$ pixels apart. FOR $l=1, \ldots, 5$
   LOOP: (over normalized confidence list)
   (a) Loop over peak list to find the l-th highest confidence peak. $C_{max}=0$ (initalize peak finding variable) FOR $j=1, \ldots, N$ LOOP: (Search for peak confidence.) IF $(C(j) > C_{max})$ THEN $C_{max} = C(j)$, jmax=j (Keep location pointer).

END IF
END FOR-LOOP (Search for peak confidence.)
(b) Negate all Peak values within $D_K$ pixels, ($D_K \approx 3$), of this maximum peak. Negation acts as a flag to denote it's "already been used" status. FOR $j=1, \ldots, N$ LOOP: (flag equivalent peaks)

$D = |P_{GT}(X_j) - P_{GT}(X_{jmax})| + |P_{GT}(Y_j) - P_{GT}(Y_{jmax})|$

IF $D < D_K$ THEN $C(j) = -C(j)$ (Flag equivalent peaks).

END IF
END FOR-LOOP (to flag equivalent peaks.)
(c) Assign quantized confidence values.

$$C_G(l) = \begin{cases} 2, & C(j) > 65 & \text{High Confidence,} \\ 1, & 36 \leq C(j) \leq 65 & \text{Medium Confidence,} \\ 0, & C(j) \leq 36 & \text{Low Confidence.} \end{cases}$$

END FOR-LOOP (over sorted normalized confidence list)
10. Return tracking data, $C_G(1, \ldots, 5)$ and $P_{GT}(1, \ldots, 5)$ to TPCL.
END PROCEDURE GTIR_TRACK While preferred embodiments of this invention have been illustrated and described, variations and modifications may be apparent to those skilled in the art. Therefore, we do not wish to be limited thereto and ask that the scope and breadth of this invention be determined from the claims which follow rather than the above description.

What is claimed is:

1. Apparatus for guiding a projectile to a target in a scene using a scene imaging sensor, said projectile having a guidance and control system for aiming the projectile at the target,
   a first tracker for analyzing the scene and for selecting a first track point representative of a target and a first confidence value serving as a reliability measure of the first selected track point,
   a second tracker for analyzing the scene and for selecting a second track point representing the target and a second confidence value which serves as a reliability measure of the second selected track point,
   each of said trackers being constructed and arranged to operate independently in a manner that is substantially statistically uncorrelated with respect to each other,
   means for generating a joint confidence value based on track point proximity, convergence and divergence,
   means for calculating a composite confidence index from the first and second confidence values and the joint confidence value,
   means for linearly combining said first and second track points pursuant to one of a set of rules selected by the confidence index to provide a new track point,
   means for outputting the new track point to the projectile guidance and control system, and
   means for generating and outputting revised track points for restarting said trackers.

2. Apparatus as defined in claim 1, wherein at least one of said trackers comprises:
   means to categorize all pixels within an image of said scene as a function of intensity comparison within a group of adjacent pixels to identify isolated pixels having peak intensity values,
   means to select one of said isolated pixels as representing said aimpoint, and
   means to generate said location and confidence output functions for said tracker from said selected isolated pixel.

3. Apparatus as defined in claim 2, wherein said means to select one of said isolated pixels as representing said aimpoint comprises:
   means to determine a first function for each of said isolated pixels, including means to determine the percent of search space distance separating each of said isolated pixels from the isolated pixel previously determined by said tracker to be the indicator of the location of said aimpoint,
   means to determine a second function for each of said isolated pixels, including means to determine the percent of search space distance separating each of said isolated pixels from a previously determined indicator of the correct location of said aimpoint, means to determine a third function for each of said isolated pixels, including means to determine the percent of full scale amplitude of each of said isolated pixels, means to determine a fourth function for each of said isolated pixels, including means to determine the percent of change between the percent of full scale amplitude of each of said isolated pixels and the percent of full scale amplitude of the isolated pixel previously determined by said tracker to be the indicator of the location of said aimpoint, means to determine a fifth function for each of said isolated pixels, including means to determine the percent of full scale amplitude of the difference between the amplitude of each of said isolated pixels and the amplitude of adjacent pixels, means to determine a sixth function for each of said isolated pixels, including means to determine the percent of change between, the percent of full scale amplitude of the difference between the amplitude of each of said isolated pixels and the amplitude of adjacent pixels, and the percent of the difference between the amplitude of the isolated pixel previously determined by said tracker to be the indicator of the location of said aimpoint and the amplitude of adjacent pixels.

4. An apparatus as defined in claim 3, further comprising:

means to sum said six functions for each of said isolated pixels, means to assign confidence levels to said sums, and means to select a plurality of said isolated pixels having the highest confidence levels as possible candidates for the pixel representing the aimpoint.

5. An apparatus as defined in claim 2, wherein said adjacent pixels constitute 32 pixels arranged as 8 lines of four pixels each radiating angularly and equally spaced from a center defined by said isolated pixel to create a geometric arrangement comprising nine rows of nine pixels.

6. Apparatus as defined in claim 1, wherein at least one of said trackers comprises:

means to create a reference template of image data centered on said aimpoint, means to correlate a sensed image with said reference template, means to create an updated reference template based on said correlation, and means to generate functions representing the location of said aimpoint as a function of the center of said updated reference template.

7. Apparatus as defined in claim 6, further comprising:

means to correlate a sensed image with said updated reference template, means to create a current updated reference template based on said correlation, and means to generate functions representing the location of said aimpoint as a function of the center of said current updated reference template.

8. Apparatus as defined in claim 7, further comprising: means to assign a confidence level to said location of functions based on the change in the correlation coefficient between the current and previous correlation.

9. Apparatus as defined in claim 1, wherein at least one of said trackers comprises:

means to create a reference template of image data centered on said aimpoint, means to correlate a sensed image with said reference template, means to create a current reference template based on said correlation, means to generate functions representing the location of said aimpoint as a function of the center of said current reference template, means to assign a confidence level to said location of functions based on the change in the correlation coefficient between the current and previous correlation, said means to compare output functions of each of said independent trackers representing the location of said aimpoint further includes means to compare said functions with the last selected aimpoint, and said means for selecting as a function of said comparison, said output functions of one of said independent trackers as the indicator of the correct location of said aimpoint is based on said confidence levels assigned by each of said trackers.

10. Apparatus for providing guidance to a selected trackpoint, comprising:

means to categorize all pixels within an image area as a function of intensity comparison within a group of adjacent pixels to identify isolated pixels having peak intensity values, means to determine a first function for each of said isolated pixels, including means to determine the percent of search space distance separating each of said isolated pixels from the isolated pixel previously determined by said tracker to be the indicator of the location of said aimpoint, means to determine a second function for each of said isolated pixels, including means to determine the percent of search space distance separating each of said isolated pixels from a previously determined indicator of the correct relative bearing to said aimpoint, means to determine a third function for each of said isolated pixels, including means to determine the percent of full scale amplitude of each of said isolated pixels, means to determine a fourth function for each of said isolated pixels, including means to determine the percent of change between the percent of full scale amplitude of each of said isolated pixels and the percent of full scale amplitude of the isolated pixel previously determined by said tracker to be the indicator of the location of said aimpoint, means to determine a fifth function for each of said isolated pixels, including means to determine the percent of full scale amplitude of the difference between the amplitude of each of said isolated pixels and the amplitude of adjacent pixels, means to determine a sixth function for each of said isolated pixels, including means to determine the percent of change between, the percent of full scale amplitude of the difference between the amplitude of each of said isolated pixels and the amplitude of adjacent pixels, and the percent of the difference between the amplitude of the isolated pixel previously determined by said tracker to be the indicator of the location of said aimpoint and the amplitude of adjacent pixels, means to perform a weighted summation of said six functions for each of said isolated pixels, means to assign confidence levels to said sums, and means to select the isolated pixels having the highest confidence levels and generate tracking functions therefrom.

11. In a method for guiding a projectile to a target in a scene using a scene imaging sensor, said projectile having and a guidance and control system for aiming the projectile at the target, providing a first tracker for analyzing the scene and for selecting a first track point representative of a target and a first confidence value serving as a reliability measure of the first selected track point, providing a second tracker for analyzing the scene and for selecting a second track point representing the target and a second confidence value which serves as a reliability measure of the second selected track point, each of said trackers being constructed and arranged to operate independently in a manner that is substantially statistically uncorrelated with respect to each other, generating a joint confidence value based on track point proximity, convergence, and divergence, calculating a composite confidence index from the first and second confidence values and the joint confidence value, linearly combining said first and second track points pursuant to one of a set of rules selected by the confidence index to provide a new track point, outputting the new track point to the projectile guidance and control system, and generating and outputting revised track points for restarting said trackers.

12. A method as defined in claim 11, including the further steps of: categorizing all pixels within an image area as a function of intensity comparisons with a group of adjacent pixels and identifying isolated pixels having peak intensity values, selecting one of said isolated pixels as representing said aimpoint, and generating said location of output functions for said tracker from said selected isolated pixel.

13. A method as defined in claim 12, wherein said means for selecting an isolated pixel as representing said aimpoint includes the steps of:

determining a first function for each of said isolated pixels by determining the percent of search space distance separating each of said isolated pixels from the isolated pixel previously determined by said tracker to be the indicator of the location of said aimpoint, determining a second function for each of said isolated pixels by determining the percent of search space distance separating each of said isolated pixels from a previously determined indicator of the correct location of said aimpoint, determining a third function for each of said isolated pixels by determining the percent of full scale amplitude of each of said isolated pixels, determining a fourth function for each of said isolated pixels by determining the percent of change between the percent of full scale amplitude of each of said isolated pixels and the percent of full scale amplitude of the isolated pixel previously determined by said tracker to be the indicator of the relative bearing to said aimpoint, determining a fifth function for each of said isolated pixels by determining the percent of full scale amplitude of the difference between the amplitude of each said isolated pixels and the amplitude of adjacent pixels, determining a sixth function for each of said isolated pixels by determining the percent of change between, the percent of full scale amplitude of the difference between the amplitude of each of said isolated pixels and the amplitude of adjacent pixels, and the percent of the difference between the amplitude of the isolated pixel previously determined by said tracker to be the indicator of the location of said aimpoint and the amplitude of adjacent pixels.

14. A method as defined in claim 13, including the further steps of: summing said six functions for each of said isolated pixels, assigning confidence levels to said sums, and selecting a plurality of said isolated pixels having the highest confidence levels as possible candidates for the pixel representing the aimpoint.

15. A method as defined in claim 14, including the further steps of considering groups of four pixels in straight lines radiating from said isolated pixels as adjacent pixels from which comparison measurements are taken.

16. A method as defined in claim 14, including the further steps of:

creating a reference template of image data centered on said aimpoint, correlating a sensed image with said reference template, creating a current reference template based on said correlation, generating functions representing the location of said aimpoint as a function of the center of said current reference template, assigning a confidence level to said location of functions based on the change in the correlation coefficient between the current and previous correlation, comparing output functions of each of said independent trackers representing the location of said aimpoint with the last selected aimpoint, and selecting as a function of the comparison and the confidence levels assigned by each tracker, the output functions of one tracker as the indicator of the correct location of the aimpoint.

17. A method as defined in claim 11, including the further steps of:

creating a reference template of image data centered on said aimpoint, correlating a sensed image with said reference template, creating an updated reference template based on said correlation, and generating functions representing the location of said aimpoint as a function of the center of said updated reference template.

18. A method as defined in claim 17, including the further steps of:

correlating a sensed image with said updated reference template, creating a current updated reference template based on said correlation, and generating functions representing the location of said aimpoint as a function of the center of said current updated reference template.

19. A method as defined in claim 18, including the further steps of:

assigning a confidence level to said location of functions based on the change in the correlation coefficient between the current and previous correlation.

20. A method as in claim 11 further including the steps of estimating the position of the sensed template from the previous track point location, inputting the slant range to the track point from the guidance and control system, estimating the track gate size due to range induced growth, estimating the uncertainty in target location due to self motion of the target and apparent target movement due to platform velocity measurement errors, calculating the search neighborhood from the target uncertainty data, executing track procedures for each tracker to generate updated track points and confidence values, inputting the first tracker track point, inputting the second tracker track point, inputting the first tracker confidence value, inputting the second tracker confidence value, calculating relative target movement between the first tracker and the second tracker track points, calculating track point separation distance, calculating predicted track point location assuming uniform target motion, specifying the names of combining track point data based on above confidence values, selecting type of processing from a case table, calculating composite track point for X,Y coordinates, generating guidance and control error correction, therefrom, outputting error correction to guidance and control so that platform is redirected to new target track point.

means for calculating composite track point for X,Y coordinates, means for generating guidance and control error correction therefrom, means for outputting error correction to guidance and control so that platform is redirected to new target track point.

21. Method as in claim 11 further in which said joint confidence generating step comprises:

estimating the position of the sensed template from the previous track point location, inputting the slant range to the track point from the guidance and control system, estimating the track gate size due to range induced growth, estimating the uncertainty in target location due to platform velocity measurement errors, calculating the search neighborhood from the target uncertainty data, executing track procedures for each tracker to generate updated track points and confidence values, inputting the first tracker track point, inputting the second tracker track point, inputting the first tracker confidence value, inputting the second tracker confidence value, calculating relative target movement between the first tracker and the second tracker track points, calculating track point separation distance, calculating predicted track point location assuming uniform target motion, calculating composite confidence index, specifying the manner of combining track point data based on the above confidence values to create a case table, and selecting type of processing from case table.

22. A method for providing guidance to a selected trackpoint comprising:

categorizing all pixels within an image area as a function of intensity comparison within a group of adjacent pixels to identify isolated pixels having peak intensity values, determining a first function for each of said isolated pixels by determining the percent of search space distance separating each of said isolated pixels from the isolated pixel previously determined by said tracker to be the indicator of the relative bearing to said aimpoint, determining a second function for each of said isolated pixels by determining the percent of search space distance separating each of said isolated pixels from a previously determined indicator of the correct location of said aimpoint, determining a third function for each of said isolated pixels by determining the percent of full scale amplitude of each of said isolated pixels, determining a fourth function for each of said isolated pixels by determining the percent of change between the percent of full scale amplitude of each of said isolated pixels and the percent of full scale amplitude of the isolated pixel previously determined by said tracker to be the indicator of the location of said aimpoint, determining a fifth function for each of said isolated pixels by determining the percent of full scale amplitude of the difference between the amplitude of each of said isolated pixels and the amplitude of adjacent pixels, determining a sixth function for each of said isolated pixels by determining the percent of change between the percent of full scale amplitude of the difference between the amplitude of each of said isolated pixels and the amplitude of each of adjacent pixels, and the percent of the difference between the amplitude of the isolated pixel previously determined to be the indicator of the relative bearing to said aimpoint and the amplitude of adjacent pixels, summing said six functions for each of said isolated pixels, assigning confidence levels to said sums, and selecting the isolated pixels having the highest confidence levels and generate tracking functions therefrom.

23. In a method for guiding a projectile to a target in a scene using a scene imaging sensor, said projectile having a guidance and control system for aiming the projectile at the target, using a first tracker for analyzing the scene and for selecting a first track point representative of a target and a first confidence value serving as a reliability of the first selected track point, and a second tracker for analyzing the scene and for selecting a second track point representing the target and a second confidence value which serves as a reliability measure of the second selected track point, each of said trackers being constructed and arranged to operate independently in a manner that is substantially statistically uncorrelated with respect to each other, the steps of:

> estimating the position of the sensed template from the previous track point location,
> inputting the slant range to the track point from the guidance and control system,
> estimating the track gate size due to range induced growth,
> estimating the uncertainty in target location due to self motion of the target and apparent target movement due to platform velocity measurement errors,
> calculating the search neighborhood from the target uncertainty data,
> executing track procedures for each tracker to generate updated track points and confidence values,
> inputting the first tracker track point,
> inputting the second tracker track point,
> inputting the first tracker confidence value,
> inputting the second tracker confidence value,
> calculating relative target movement between the first tracker and the second tracker track points,
> calculating track point separation distance,
> calculating predicted track point location assuming uniform target motion,
> calculating composite confidence index,
> providing a case table means for specifying the manner of combining track point data based on the above confidence values,
> selecting type of processing from case table,
> calculating composite track point for X,Y coordinates,
> generating Guidance and Control error correction,
> outputting error Correction to Guidance and control so that the platform is redirected to the new target track point.

24. In apparatus for guiding a projectile to a target in a scene using a scene imaging sensor, said projectile having a guidance and control system for aiming the projectile at the target, using a first tracker for analyzing the scene and for selecting a first track point representative of a target and a first confidence value serving as a reliability measure of the first selected track point, a second tracker for analyzing the scene and for selecting a second track point representing the target and a second confidence value which serves as a reliability measure of the second selected track point, each of said trackers being constructed and arranged to operate independently in a manner that is substantially statistically uncorrelated with respect to each other, > means for estimating the position of the sensed template from the previous track point location,
> means for inputting the slant range to the track point from the guidance and control system,
> means for estimating the track gate size due to range induced growth,
> means for estimating the uncertainty in target location due to self motion of the target and apparent target movement due to platform velocity measurement errors,
> means for calculating the search neighborhood from the target uncertainty data,
> means for executing track procedures for each tracker to generate updated track points and confidence values,
> means for inputting the first tracker track point,
> means for inputting the second tracker track point,
> means for inputting the first tracker confidence value,
> means for inputting the second tracker confidence value,
> means for calculating relative target movement between the first tracker and the second tracker track points,
> means for calculating track point separation distance,
> means for calculating predicted track point location assuming uniform target motion,
> means for calculating composite confidence index,
> case table means for specifying the manner of combining track point data based on the above confidence values,
> means for selecting type of processing from case table,
> means for calculating composite track point for X,Y coordinates,
> means for generating guidance and control error correction,
> means for outputting error correction to guidance and control so that platform is redirected to new target track point.

* * * * *